United States Patent
Kawamura et al.

(10) Patent No.: US 6,804,795 B1
(45) Date of Patent: Oct. 12, 2004

(54) ELECTRONIC DEVICE AND ITS REPAIRING METHOD

(75) Inventors: Harumi Kawamura, Tokyo (JP); Masahiko Sato, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/701,786

(22) PCT Filed: Apr. 2, 2000

(86) PCT No.: PCT/JP00/02155

§ 371 (c)(1),
(2), (4) Date: May 7, 2001

(87) PCT Pub. No.: WO00/60877

PCT Pub. Date: Oct. 12, 2000

(30) Foreign Application Priority Data

Apr. 2, 1999 (JP) .......................... 11/096835

(51) Int. Cl.[7] .............................................. G06F 11/00
(52) U.S. Cl. .............................. 714/10; 714/4; 701/33
(58) Field of Search .............................. 714/4, 10, 48; 701/33

(56) References Cited

U.S. PATENT DOCUMENTS

| 4,667,330 | A | * | 5/1987 | Kumagai | ..................... 714/824 |
| 5,699,505 | A | * | 12/1997 | Srinivasan | ..................... 714/31 |
| 6,023,268 | A | * | 2/2000 | Britt et al. | ..................... 709/203 |
| 6,169,725 | B1 | * | 1/2001 | Gibbs et al. | ..................... 370/216 |
| 6,259,442 | B1 | * | 7/2001 | Britt et al. | ..................... 345/721 |
| 6,446,201 | B1 | * | 9/2002 | Gunther | ..................... 713/1 |
| 6,467,065 | B1 | * | 10/2002 | Mendez et al. | ..................... 714/800 |
| 6,615,376 | B1 | * | 9/2003 | Olin et al. | ..................... 714/57 |

FOREIGN PATENT DOCUMENTS

| EP | 0 756 276 | 1/1997 |
| EP | 0 841 776 | 5/1998 |

* cited by examiner

Primary Examiner—Robert Beausoliel
Assistant Examiner—B Duncan
(74) Attorney, Agent, or Firm—Frommer Lawrence & Haug LLP; William S. Frommer; Dennis M. Smid

(57) ABSTRACT

In a system in which a plurality of devices are connected by using a digital interface bus, in order to readily and easily cope with a specific device when the specific device malfunctions, the system, in compliance with a predetermined digital interface in which a predetermined identification code, a processing target discriminating code, a processing field prescribing code and processing executing information are set, includes means 12, 23 for recognizing the identification code, means 14, 22 for discriminating the processing target when the identification code is recognized and information processing means 16 to 19, 24, 25 for executing the processing in accordance with the processing field if the processing target contains its own device, wherein a defective device can be specified and repaired with ease.

12 Claims, 19 Drawing Sheets

FIG. 9

| OFFSET | NAME | OPERATION |
|---|---|---|
| 000h | STATE CLEAR | STATE AND CONTROL INFORMATION |
| 004h | STATE SET | SET STATE CLEAR BIT |
| 008h | NODE ID | INDICATE 16-BIT NODE ID |
| 00Ch | RESET START | START COMMAND RESET |
| 018-01Ch | SPLIT TIME OUT | PRESCRIBE MAXIMUM TIME OF SPLIT |
| 200h | CYCLE TIME | CYCLE TIME |
| 210h | BUSY TIME OUT | PRESCRIBE LIMIT OF RETRY |
| 21Ch | BUS MANAGER | INDICATE BUS MANAGER ID |
| 220h | BAND AVAILABLE SITUATION | INDICATE BAND WHICH CAN BE ALLOCATED TO ISOCHRONOUS COMMUNICATION |
| 224h-228h | CHANNEL AVAILABLE SITUATION | INDICATE EACH CHANNEL AVAILABLE SITUATION |

FIG. 10

| | |
|---|---|
| 900h | OUTPUT MASTER PLUG REGISTER |
| 904h | OUTPUT PLUG CONTROL REGISTER #0 |
| 908h | OUTPUT PLUG CONTROL REGISTER #1 |
| ⋮ | ⋮ |
| 97Ch | OUTPUT PLUG CONTROL REGISTER #30 |
| 980h | INPUT MASTER PLUG REGISTER |
| 984h | INPUT PLUG CONTROL REGISTER #0 |
| 988h | INPUT PLUG CONTROL REGISTER #1 |
| ⋮ | ⋮ |
| 9FCh | INPUT PLUG CONTROL REGISTER #30 |

FIG. 11A oMPR

| DATA RATE CAPABILITY | BROADCASTING CHANNEL BASE | AUXILIARY EXTENDED FIELD | MAIN EXTENDED FIELD | (RESERVED) | NUMBER OF OUTPUT PLUGS |
|---|---|---|---|---|---|
| 2 | 6 | 8 | 8 | 3 | 5 (BITS) |

FIG. 11B oPCR[n]

| ON-LINE | BROADCASTING CONNECTION COUNTER VALUE | P-P CONNECTION COUNTER VALUE | (RESERVED) | NUMBER OF CHANNELS | DATA RATE | OVERHEAD PAYLOAD ID |
|---|---|---|---|---|---|---|
| 1 | 6 | 6 | 2 | 6 | 2 | 4 | 10 (BITS) |

FIG. 11C iMPR

| DATA RATE CAPABILITY | AUXILIARY EXTENDED FIELD | (RESERVED) | MAIN EXTENDED FIELD | (RESERVED) | NUMBER OF INPUT PLUGS |
|---|---|---|---|---|---|
| 2 | 8 | 6 | 8 | 3 | 5 (BITS) |

FIG. 11D oPCR[n]

| ON-LINE | BROADCASTING CONNECTION COUNTER VALUE | P-P CONNECTION COUNTER VALUE | (RESERVED) | NUMBER OF CHANNELS | (RESERVED) |
|---|---|---|---|---|---|
| 1 | 6 | 6 | 2 | 6 | 16 (BITS) |

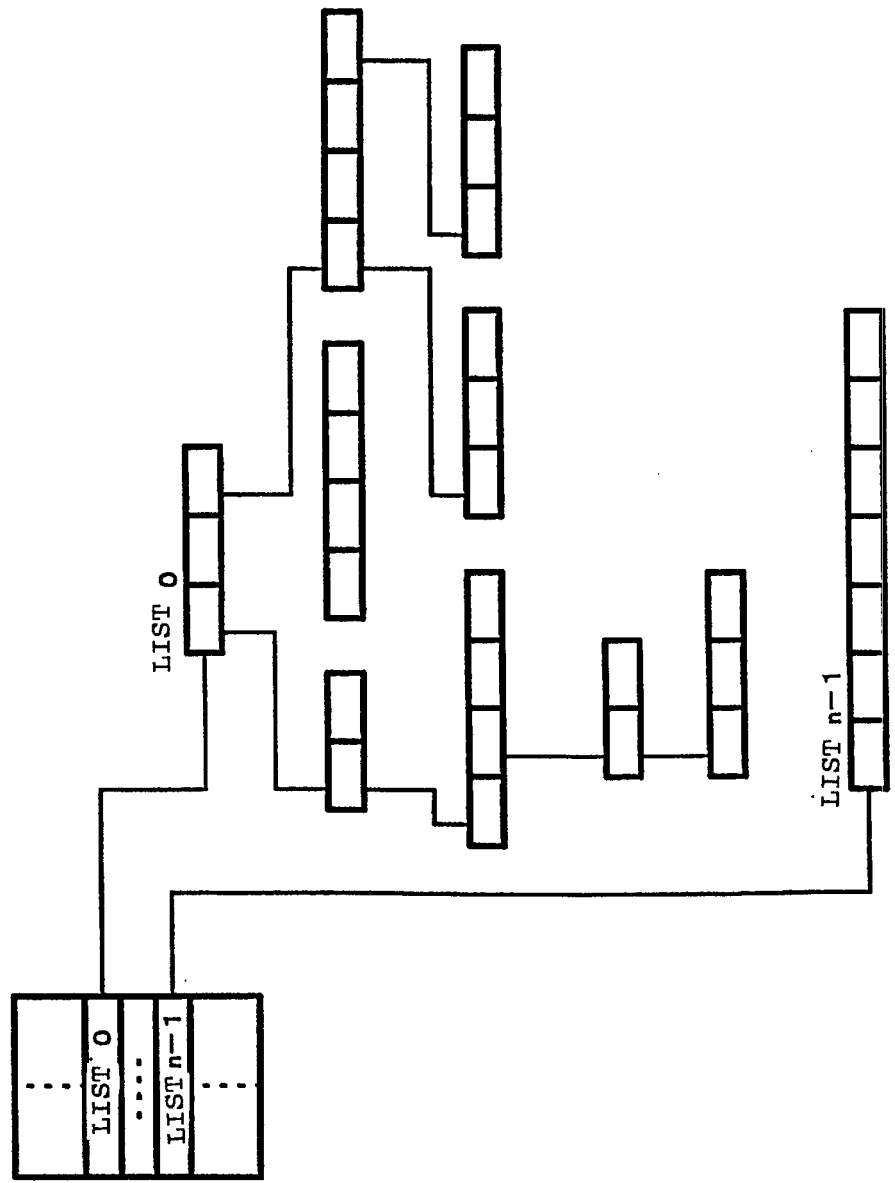

FIG. 14

| address | GENERAL SUBUNIT DESCRIPTOR | |
|---|---|---|
| | CONTENTS | |
| $00\ 00_{16}$ | DESCRIPTOR LENGTH | |
| $00\ 01_{16}$ | | |
| $00\ 02_{16}$ | GENERATION ID | |
| $00\ 03_{16}$ | SIZE OF LIST ID | |
| $00\ 04_{16}$ | SIZE OF OBJECT ID | |
| $00\ 05_{16}$ | SIZE OF OBJECT POSITION | |
| $00\ 06_{16}$ | NUMBER OF ROOT OBJECT LIST (n) | |
| $00\ 07_{16}$ | | |
| $00\ 08_{16}$ | ROOT OBJECT LIST ID 0 | |
| ⋮ | | |
| ⋮ | ⋮ | |
| ⋮ | ROOT OBJECT LIST ID n−1 | |
| ⋮ | SUBUNIT DEPENDENT LENGTH | |
| ⋮ | SUBUNIT DEPENDENT GUIDE | |
| ⋮ | MANUFACTURER DEPENDENT LENGTH | |
| ⋮ | MANUFACTURER DEPENDENT GUIDE | |

FIG. 15

| VALUE OF GENERATION ID ||
|---|---|
| GENERATION ID | meaning |
| $00_{16}$ | AV/C GENERAL VERSION 3.0 STANDARD |
| OTHER VALUE | RESERVED |

FIG. 16

| ALLOCATION OF LIST ID VALUE ||
|---|---|
| VALUE | LIST |
| $0000_{16}$ $0FFF_{16}$ | RESERVED |
| $1000_{16}$ $3FFF_{16}$ | SUBUNIT TYPE DEPENDENT VALUE |
| $4000_{16}$ $FFFF_{16}$ | RESERVED |
| $1\ 000_{16}$ | SUBUNIT TYPE DEPENDENT VALUE |

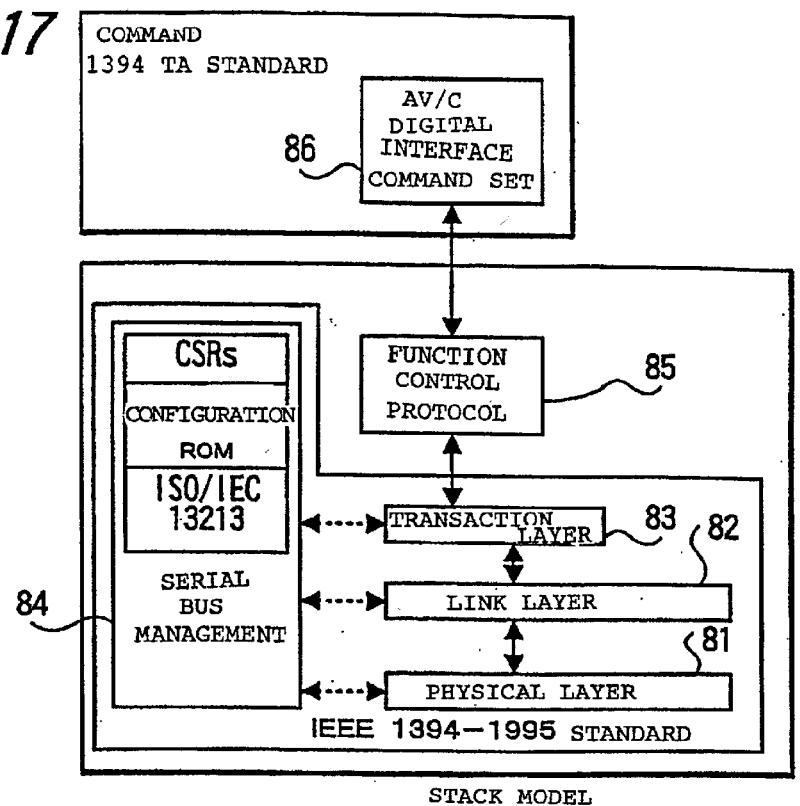
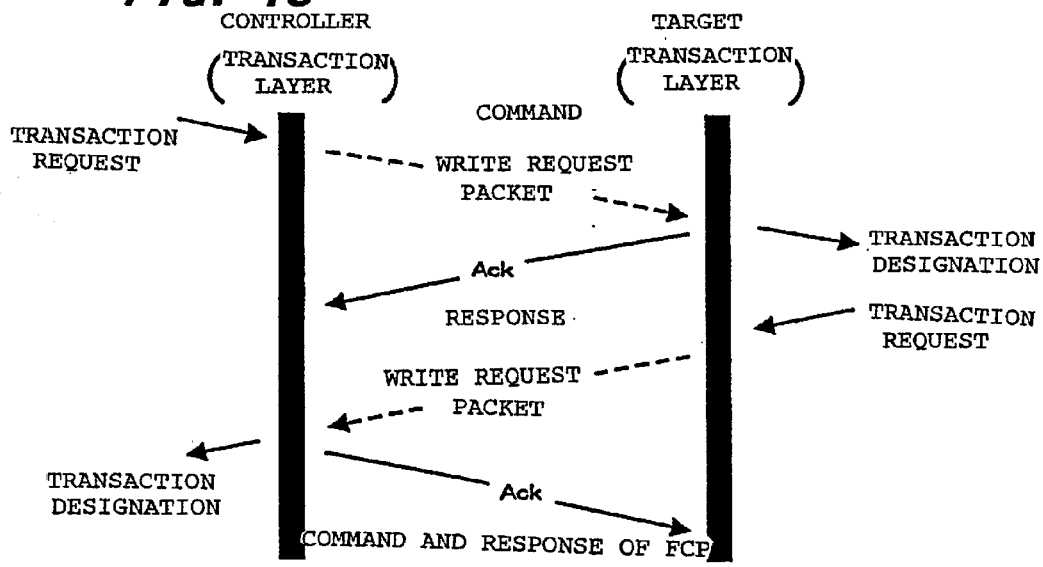

FIG. 21

| COMMAND TYPE/RESPONSE | | |
|---|---|---|
| COMMAND | 0000 | CONTROL |
| | 0001 | STATUS |
| | 0010 | SPECIFIC INQUIRY |
| | 0011 | NOTIFY |
| | 0100 | GENERAL INQUIRY |
| | 0101 | (RESERVED) |
| | ~ | |
| | 0111 | |
| RESPONSE | 1000 | NOT IMPLEMENTED |
| | 1001 | ACCEPTED |
| | 1010 | REJECTED |
| | 1011 | IN TRANSITION |
| | 1100 | IMPLEMENTED |
| | 1101 | CHANGED |
| | 1110 | (RESERVED) |
| | 1111 | INTERIM |

| SUBUNIT TYPE | |
|---|---|
| 00000 | VIDEO MONITOR |
| ~ | |
| 00011 | DISC RECORDER/PLAYER |
| 00100 | TAPE RECORDER/PLAYER |
| 00101 | TUNER |
| 00111 | VIDEO CAMERA |
| 01010 | |
| 11100 | VENDER DEPENDENT |
| 11101 | RESERVED VALUE |
| 11110 | (SPECIFIC SUBUNIT TYPE) |
| 11111 | UNIT |

| OPCODE: OPERATION CODE | |
|---|---|
| 00h | VENDER DEPENDENT VALUE |
| 50h | SEARCH MODE |
| 51h | TIME CODE |
| 52h | ATN |
| 60h | OPEN MEMORY |
| 61h | READ MEMORY |
| 62h | WRITE MEMORY |
| C1h | LOAD |
| C2h | RECORD |
| C3h | PLAYBACK |
| C4h | REWIND |
| ~ | |

FIG. 22A

TAPE RECORDER IN THE CASE /PLAYER OF IDO PLAYBACK    FORWARD DIRECTION

AV/C CONTROL

| CTS=0000 | C TYPE =0000 | SUBUNIT TYPE = 00100 | id= 000 | OPERATION CODE = C3h | OPERATION LAND = 75h |
|---|---|---|---|---|---|

FIG. 22B

TAPE RECORDER IN THE CASE /PLAYER OF IDO PLAYBACK    FORWARD DIRECTION

AV/C ACCEPTED

| CTS=0000 | RESPONSE=1001 | SUBUNIT TYPE = 00100 | id= 000 | OPERATION CODE = C3h | OPERATION LAND = 75h |
|---|---|---|---|---|---|

FIG. 23

| OPERATION CODE | SERVICE |
|---|---|
| OPERATION LAND [0] | TYPE: COMMAND |
| OPERATION LAND [1] | TYPE DEPENDENT LENGTH |
| OPERATION LAND [2] | CATEGORY: DIAGNOSIS |
| OPERATION LAND [3] | ERROR CODE |

FIG. 24

| OPERATION CODE | SERVICE |
|---|---|
| OPERATION LAND [0] | TYPE: VENDER DEPENDENT DATA |
| OPERATION LAND [1] | TYPE: DATA LENGTH |
| OPERATION LAND [2] | VENDER ID |
| OPERATION LAND [3] | |
| OPERATION LAND [4] | |
| OPERATION LAND [5] | VENDER ID DEPENDENT DATA FIELD |
| | |

ELECTRONIC DEVICE AND ITS REPAIRING METHOD

TECHNICAL FIELD

The present invention relates to an electronic device for use with an audio-visual system comprising a plurality of devices and its repair method, for example. More particularly, the present invention relates to an electronic device and its repair method in which defects of respective devices can be detected and repaired satisfactorily by using a digital interface laid among a plurality of devices, for example.

BACKGROUND ART

In an audio-visual system comprising a plurality of devices, for example, it has been proposed to transmit audio and video data and various control data among the devices by using a digital interface. Specifically, in the format of the digital interface prescribed by the IEEE (The Institute of Electrical and Electronics Engineers) 1394, for example, respective devices connected by the bus are called nodes. During one frame period, isochronous transfer mode packets and asynchronous transfer mode packets can be transmitted among the nodes connected by the bus.

When data is transmitted through the interface prescribed by the IEEE 1394, stream data of a large capacity such as video data and audio data is transmitted in the isochronous transfer mode. When data is transmitted in the isochronous transfer mode, while a predetermined transmission band is being secured in advance, transmission of data is executed so that data is transmitted in the isochronous transfer mode with a real time property being secured. However, in the isochronous transfer mode, when an error occurs in the transmission, the isochronous transfer mode has no mechanism capable of protecting data from the error so that data is lost accordingly.

Data such as control data and still picture data are transmitted in the asynchronous transfer mode. In the case of the asynchronous transfer mode, data can be transmitted by transmitting asynchronous packets from a node which secures a transmission line by executing processing called an arbitration to secure a band during a period which is not available in the isochronous transfer. In this mode, a reliable transmission can be guaranteed by executing processing of acknowledge and retry. However, when the band on the bus is secured, each packet is transmitted so that transmission timing cannot be made constant.

When a plurality of audio devices and video devices are connected by the IEEE 1394 system standard bus, a controller is able to control operation of a controlled device in a remote control fashion by transmitting various kinds of control data from one device (controller) to the other device (controlled device).

When such control data are transmitted, there can be applied a transmission system of an AV/C command (AV/C Command Transaction Set) which is a control command applied to an audio-visual device (AV device), for example. Details of the IEEE 1394 system and details of the AV/C command are laid-open in the internet home page http://www.1394TA.org.

When an audio-visual system in which a plurality of apparatus are connected by using the above digital interface is constructed in, a home, for example, there is used an arrangement shown in FIG. 2, for example. Specifically, as shown in FIG. 2, there is provided a bus line 9 which is prescribed by the IEEE 1394, for example. To this bus line 9, there are connected a video recording and playbacking apparatus (VCR) 100 manufactured by a vender A, a disc recording and playbacking apparatus (MD) 200 manufactured by a vender B, a disc playbacking apparatus (CD) 300 manufactured by a vender C and a television receiver (TV) 400 manufactured by a vender D.

However, when the audio-visual system is constructed by using such bus line 9, if one apparatus malfunctions, an influence of the malfunctioning apparatus spreads to the whole of the bus line 9. Further, in that case, a user cannot visually specify a defective apparatus. Accordingly, in order to solve such problem, a user has to request the venders A, B, C, D to repair their own apparatus, respectively, and hence extremely a lot of time and labor should be wasted.

On the other hand, a technology capable of detecting the defective part of an apparatus and repairing the detected part by using codes which can be set to respective venders and are prescribed in the above IEEE 394 interface has been developed. However, the above technology can be implemented after the defective apparatus has been specified and therefore cannot be used when a user cannot visually specify a defective apparatus as described above.

DISCLOSURE OF INVENTION

In view of the aforesaid aspect, it is an object of the present invention to provide an electronic device and its repair method in which when a specific device in a system with a plurality of apparatus connected thereto by using a bus based on a conventional digital interface malfunctions, such defective device can be detected and repaired readily and easily.

According to the first invention, there is provided an electronic device which, in compliance with a predetermined digital interface wherein a predetermined identification code, a processing target discriminating code, a processing field prescribing code and processing information are set, comprises:

means for recognizing the identification code;

means for discriminating the processing target when the identification code is recognized; and processing means for executing the processing information in accordance with the processing field if the processing target contains its own device. With this arrangement, it is possible to realize the device in which the defective device can be detected and repaired with ease.

According to the second invention, in the electronic device according to the first invention, a code for targeting all devices and a code for targeting a device of each of the venders are set to the processing target discriminating code, and the processing information is executed if it is determined that the code for processing all devices or the code for targeting each vender device targets its own device. With this arrangement, processing necessary for the target device can be executed satisfactorily.

According to the third invention, in the electronic device according to the second invention, a processing field prescribing code following the code for targeting all devices and the processing information are determined generalpurposely and processing is executed in accordance with them. With this arrangement, processing necessary for the device can be executed satisfactorily.

According to the fourth invention, in the electronic device according to the second invention, the processing field prescribing code following the code for targeting each vender device and the processing information are determined unique to each vender and processing is executed in accordance with them. With this arrangement, processing unique to each vender and which is required by the device can be executed satisfactorily.

According to the fifth invention, in the electronic device according to the second invention, when a master device transmits the processing information for inquiring a malfunction of a device together with the code for targeting all devices, a slave device transmits answer information for the inquiry about the malfunction to the master device. With this arrangement, a defective device can be specified easily.

According to the sixth invention, in the electronic device according to the fifth invention, the slave device includes a diagnosing means for diagnosing the malfunction of the device and information of the diagnosing means is transmitted to the master device as answer information for the inquiry about the malfunction. With this arrangement, a defective device can be specified easily.

According to the seventh invention, in the electronic device according to the fifth invention, the master device includes a communication means for communicating with the outside, and, together with the code for targeting each vender device, the processing information on repairing the slave device and which is determined unique to each vender are transmitted through the communication means. With this arrangement, a defective device can be specified and a defective device can be repaired by a method unique to each vender through the communication from the outside.

According to the eighth invention, in the electronic device according to the first invention, in compliance with an AV/C command of an IEEE 1394 interface, the predetermined identification code is set to the interval of the operation code of the AV/C command and the processing target discriminating code is set to a first of the AV/C command, the processing field prescribing code is set to a second operand and the processing information is set to a third operation land. With this arrangement, a device can be realized by a general-purpose interface.

According to the ninth invention, there is provided an electronic device repair method in which, by setting a predetermined identification code, a processing target discriminating code, a processing field prescribing code and processing information to an arbitrary digital interface, when the identification code is recognized, the processing target is discriminated and if the processing target contains its own device, the processing information is executed in accordance with the processing field. With this arrangement, a defective device can be specified and the defective device can be repaired easily through the digital interface.

According to the tenth invention, in the electronic device repair method according to the ninth invention, a code for targeting all devices and a code for targeting each vender device are set to the processing target discriminating code, and the processing information is executed if it is determined that the code for processing all devices or the code for targeting each vender device targets its own device. With this arrangement, processing necessary for the target device can be executed satisfactorily.

According to the eleventh invention, according to the electronic device repair method according to the tenth invention, a processing field prescribing code following the code for targeting all devices and the processing information are determined general-purposely and processing is executed in accordance with them. With this arrangement, processing necessary for the device can be executed satisfactorily.

According to the twelfth invention, in the electronic device repair method according to the tenth invention, the processing field prescribing code following the code for targeting each vender device and the processing information are determined unique to each vender and processing is executed in accordance with them. With this arrangement, processing unique to each vender and, which is required by the device can be executed satisfactorily.

According to the thirteenth invention, in the electronic device repair method according to the tenth invention, when a master device transmits the processing information for inquiring a defect of a device together with the code for targeting all devices, a slave device transmits answer information for the inquiry about the defect to the master device. With this arrangement, a defective device can be specified easily.

According to the fourteenth invention, in the electronic device repair method according to the thirteenth invention, the slave device diagnoses the defect of the device and a diagnosed result for the inquiry about the defect is transmitted to the master device as the answer information. With this arrangement, a defective device can be specified easily.

According to the fifteenth invention, in the electronic device repair method according to the thirteenth invention, the master device communicates with the outside and the processing information for repairing the slave device and which is determined unique to each vender as well as the code for targeting each vender device are transmitted through the communication. With this arrangement, a defective device can be specified and a defective device can be repaired by a method unique to each vender through the communication from the outside.

According to the sixteenth invention, in the electronic device repair method according to the ninth invention, in compliance with an AV/C command of an IEEE 1394 interface, the predetermined identification code is set to the interval of the operation code of the AV/C command and the processing target discriminating code is set to a first operand of the AV/C command, the processing field prescribing code is set to a second operation land and the processing information is set to a third operand. With this arrangement, a device can be realized by a general-purpose interface.

BRIEF DESCRIPTION OF DRAWINGS

FIG. 9 is an explanatory diagram showing examples of positions, names and operation of major CSRs.

FIG. 10 is an explanatory diagram showing an example of a plug control register.

FIG. 11 is an explanatory diagram showing examples of oMPR, oPCR, iMPR, iPCR.

FIG. 13 is an explanatory diagram showing an example of a data structure based on a descriptor hierarchical structure.

FIG. 14 is an explanatory diagram showing an example of a data structure of a descriptor.

FIG. 15 is an explanatory diagram showing an example of a generation ID shown in FIG. 14.

FIG. 16 is an explanatory diagram showing an example of a list ID shown in FIG. 14.

FIG. 17 is an explanatory diagram showing an example of a stack model of an AV/C command.

FIG. 18 is an explanatory diagram showing an example of a relationship between a command and a response of an AV/C command.

FIG. 21 is an explanatory diagram showing concrete examples of AV/C commands.

FIG. 22 is an explanatory diagram showing concrete examples of commands and responses of AV/C commands.

FIG. 23 is an explanatory diagram showing a data structure of a diagnosis command.

FIG. 24 is an explanatory diagram showing an example of a data structure inherent in a manufacturer.

BEST MODE FOR CARRYING OUT THE INVENTION

An embodiment according to the present invention will be described below with reference to the drawings.

Figure 2:
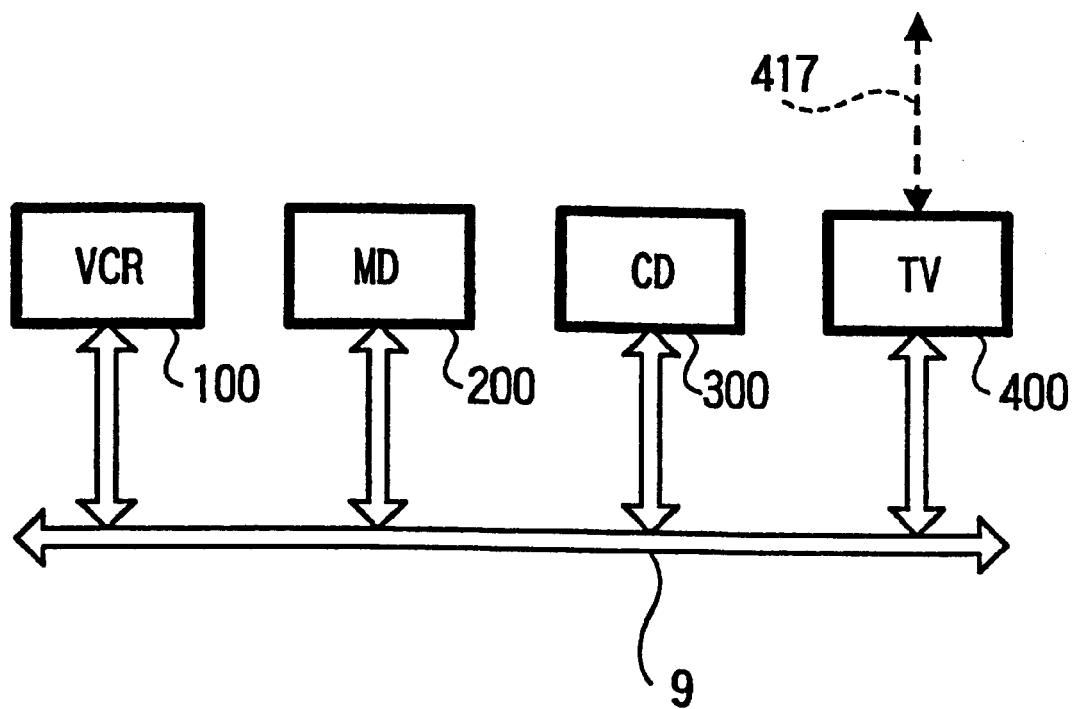
FIG. 2 is a block diagram showing an example of a whole system configuration.

First, an example of a whole arrangement of an audio-visual system according to this embodiment will be described with reference to FIG. 2. Specifically, as shown in FIG. 2, for example, a video recording and playbacking apparatus 100 manufactured by a vender A, an audio recording and playbacking apparatus 200 manufactured by a vender B, an audio playbacking apparatus 300 manufactured by a vender C and a television receiver 200 manufactured by a vender D are connected to a bus line 9 prescribed by the IEEE 1394, for example. The television receiver 400, for example, in this system is assumed to be a controller for controlling communication on the bus 9. The television receiver 400 includes a communication means for establishing a connection to the outside through an internet 417 or the like.

Figure 3:
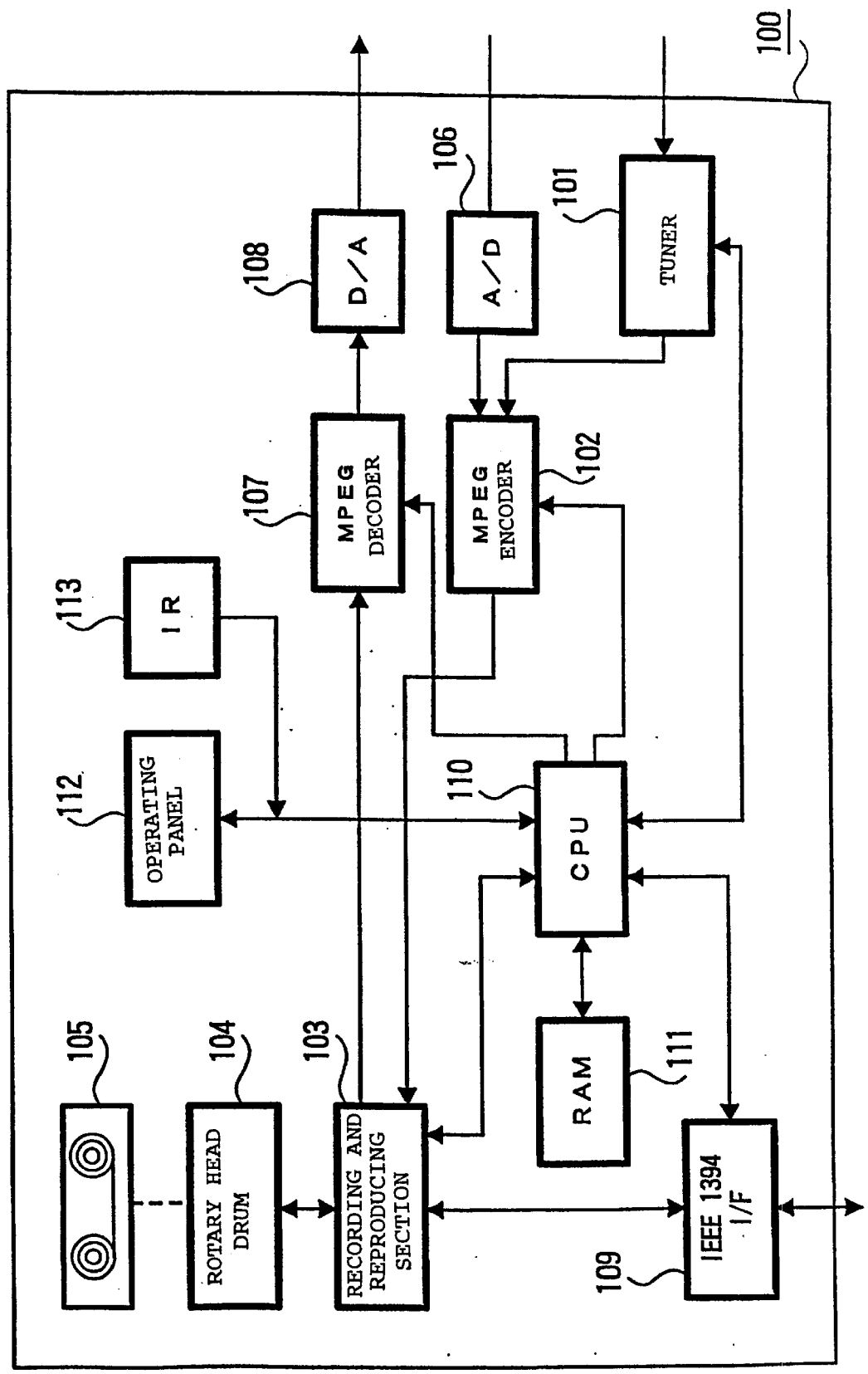
FIG. 3 is a block diagram showing an example of a video recording and playbacking apparatus.

FIG. 3 is a block diagram showing an example of the video recording and playbacking apparatus 100. The video recording and playbacking apparatus 100 according to this embodiment is an apparatus called a digital VCR (digital video cassette recorder) in which a video signal and an audio signal are recorded and playbacked as digital data by using a video tape cassette as a recording medium.

The arrangement of the recording system will be described. Digital broadcast data obtained when a built-in tuner 101 of the video recording and playbacking apparatus 100 receives data of a predetermined channel is supplied to an MPEG (Moving Picture Experts Group) encoder 102 which processes the supplied digital broadcast data to provide video data and audio data of a system suitable for recording, e.g., MPEG2 system. If received broadcast data is MPEG2 system data, then such received broadcast data need not be processed by the encoder 102.

The data encoded by the MPEG encoder 102 is supplied to a recording and playbacking section 103, in which it is subjected to processing for recording. Processed recording data is supplied to a recording head within a rotary head drum 104 and thereby recorded on a magnetic tape within a tape cassette 105.

Analog video and audio signals inputted from the outside are converted into digital data by an analog-to-digital converter 106 and supplied to the MPEG encoder 102, in which they are encoded as MPEG2 system video data and audio data, for example. The video data and the audio data are supplied to the recording and playbacking section 103, in which they are subjected to processing for recording. Processed recording data is supplied to the recording head within the rotary head drum 104 and thereby recorded on the magnetic tape within the tape cassette 105.

The arrangement of the playbacking system will be described. A signal playbacked from the magnetic tape within the tape cassette 105 by the rotary head drum 104 is supplied to the recording and playbacking section 103 which processes the supplied signal to provide video and audio data. The video and audio data are supplied to an MPEG decoder 107, in which those data are processed according to the MPEG2 system, for example. The data thus decoded is supplied to a digital-to-analog converter 108, in which they are converted into analog video and audio signals and outputted to the outside.

The video recording and playbacking apparatus 100 includes an interface section 109 to connect to an IEEE 1394 system bus. Video and audio data supplied from the IEEE 1394 bus to the interface section 109 are supplied to the recording and playbacking section 103 and thereby recorded on the magnetic tape within the tape cassette 105. Video and audio data reproduced from the magnetic tape within the tape cassette 105 are supplied from the recording and playbacking section 103 to the interface section 109 and thereby transmitted to the IEEE 1394 system bus.

When video and audio data are transmitted through the interface section 103 and the system in which data is recorded on the medium (magnetic tape) by the video recording and playbacking apparatus 100 (e.g., the above MPEG2 system) and a system of data transmitted on the IEEE 1394 system bus differ from each other, the system may be converted by a circuit within the video recording and playbacking apparatus 100.

The video recording and playbacking apparatus 100 records and reproduces data and data is transmitted through the interface section 109 under control of a central processing unit (CPU) 110. A memory 111, which is a RAM for work area, is connected to the CPU 110. Operating information from an operating panel 112 and controlling information received at an infrared-ray light-receiving section 113 from a remote control apparatus are supplied to the CPU 110 which can control operation corresponding to the operating information and the controlling information. When the interface section 109 receives controlling data such as an AV/C command, which will be described later on, through the IEEE 1394 system bus, the received controlling data is supplied to the CPU 110 and the CPU 110 can control corresponding operation.

Figure 4:
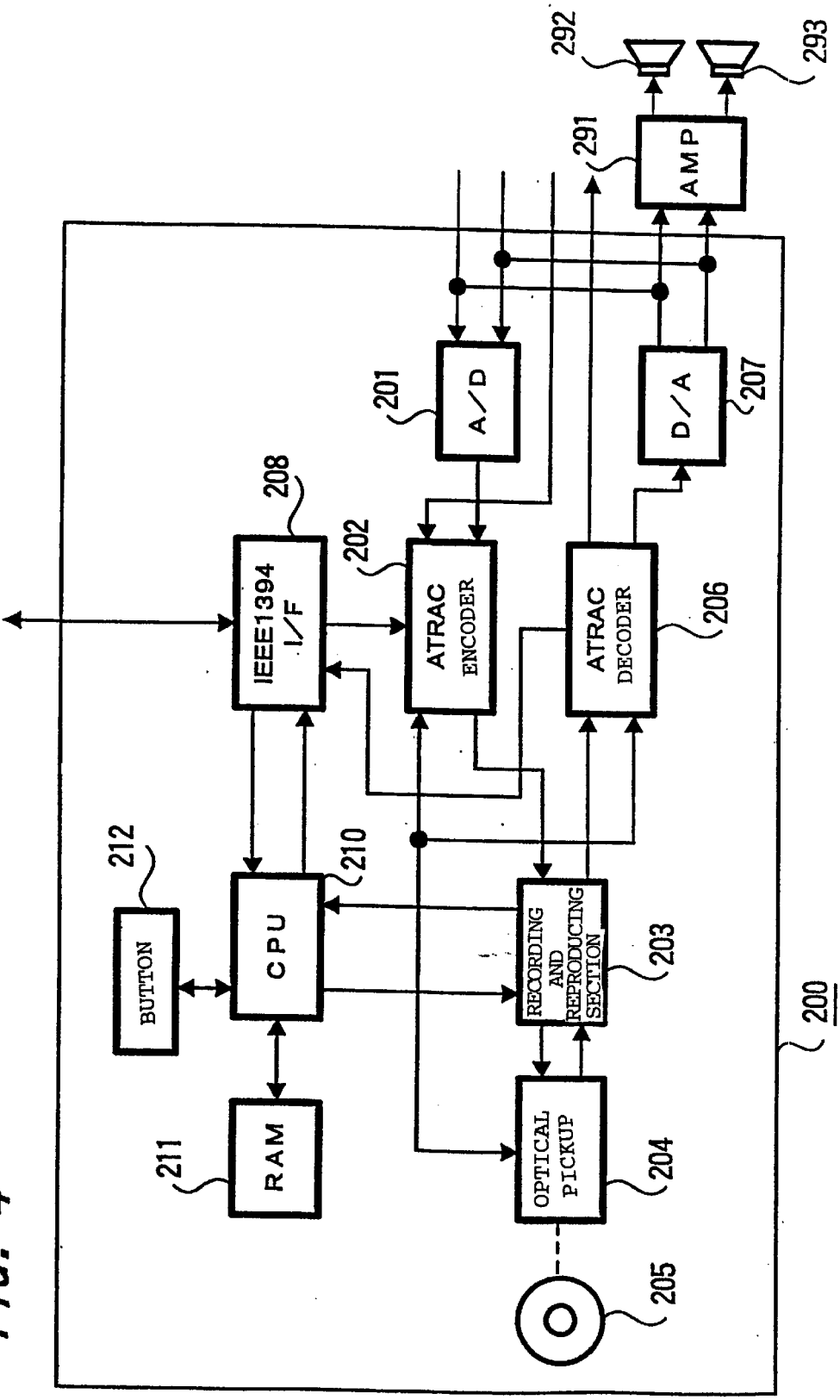
FIG. 4 is a block diagram showing an example of an audio recording and playbacking apparatus.

FIG. 4 is a block diagram showing an example of an audio recording and playbacking apparatus 200. The audio recording and playbacking apparatus 200 according to this embodiment is an apparatus in which an audio signal or the like can be recorded and playbacked as digital data by using a magneto-optical disk or an optical disk housed within a resin package and which is called an MD (mini disc) as a recording medium.

The arrangement of the recording system will be described. An analog two-channel audio signal inputted from the outside is converted into digital audio data by an analog-to-digital converter 201. The converted digital audio data is supplied to an ATRAC (Adaptive Transform Acoustic Coding) encoder 202 and thereby encoded into audio data compressed by the ATRAC system. When digital audio data is directly inputted from the outside, the inputted audio data bypasses the analog-to-digital converter 201 and is directly supplied to the ATRAC encoder 202. The data encoded by the encoder 202 is supplied to a recording and playbacking section 203, in which it is processed for recording. Based on the processed data, data is recorded on a disk (magnetooptical disk) 205 by driving an optical pickup 204. In the course of recording, a magnetic field is modulated by a magnetic head, not shown.

The arrangement of the playbacking system will be described. The recorded data is read out from the disk (magnetooptical disk or optical disk) 205 by the optical pickup 204 and playbacked by the recording and playbacking section 203 thereby to obtain audio data compressed by the ATRAC system. The playbacked audio data is supplied to an ATRAC decoder 206, in which it is decoded into digital audio data of a predetermined system. The audio data thus decoded is supplied to a digital-to-analog converter 207, in which it is converted into a two-channel analog audio signal and outputted. When digital audio data is directly outputted to the outside, the audio data decoded by the ATRAC decoder 206 bypasses the digital-to-analog converter 207 and is directly outputted to the outside. In the example shown in FIG. 4, the analog outputted audio signal is supplied to an amplifying apparatus 291, in which it is subjected to audio output processing such as amplification and two-channel audio (audio) signals are outputted from speakers 292, 293 connected to the amplifying apparatus.

The audio recording and playbacking apparatus 200 includes an interface section 208 for connecting circuits to the IEEE 1394 system bus. Audio data supplied from the IEEE 1394 system bus to the interface section 208 is supplied through the ATRAC encoder 202 to the recording and playbacking section 202 and thereby recorded on the disk 205. Audio data playbacked from the disk 205 is supplied from the recording and playbacking section 202 through the ATRAC decoder 206 to the interface section 208 and thereby transmitted to the IEEE 1394 system bus.

The audio recording and playbacking apparatus 200 records and reproduce data and transmits data through the interface section 208 under control of a central processing unit (CPU) 210. A memory 211, which is a RAM for a work area, is connected to the CPU 210. Operating information from an operating panel 212 is supplied to the CPU 210 which controls operation corresponding to the operating information. When the interface section 208 receives controlling data such as an AV/C command, which will be described later on, through the IEEE 1394 system bus, the controlling data is supplied to the CPU 210 and the CPU 210 can control corresponding operation.

Figure 5:
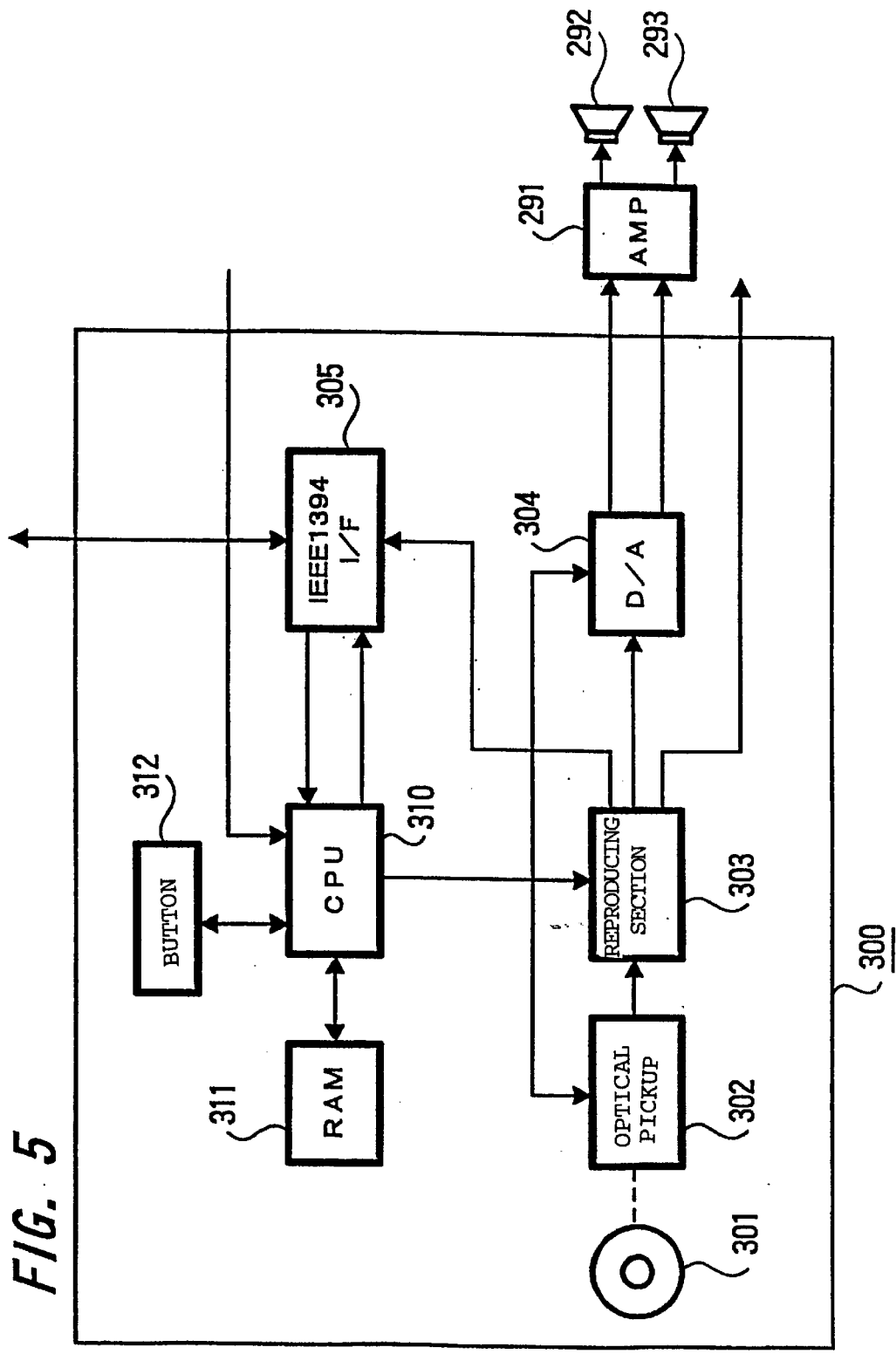
FIG. 5 is a block diagram showing an example of an audio playbacking apparatus.

FIG. 5 is a block diagram showing an example of the audio playbacking apparatus 300. The audio playbacking apparatus 300 according to this embodiment is an apparatus in which digital audio data is playbacked by using an optical disk called a CD (compact disc) in which digital audio data was recorded in advance as a recording medium.

The arrangement for reproduction will be described. Data is read out from an optical disk 301 by an optical pickup 302 and a playbacking section 303 reproduces audio data. The playbacked audio data is supplied to a digital-to-analog converter 304, in which it is converted into a two-channel analog audio signal and outputted. When digital audio data is directly outputted to the outside, the playbacked audio data bypasses the digital-to-analog converter 304 and is directly outputted to the outside. In the example shown in FIG. 5, the outputted audio signal is supplied to an amplifying apparatus 291, in which it is subjected to audio output processing i such as amplification and two-channel audio (audio) signals are outputted from speakers 292, 293 connected to the amplifying apparatus.

The audio playbacking apparatus 300 includes an interface section 305 for connecting circuits to the IEEE 1394 system bus, and is able to supply audio data playbacked from the optical disk 301 from the playbacking section 302 to the interface section 305 from which it can be transmitted to the IEEE 1394 system bus.

The audio playbacking apparatus 300 reproduces data and transmits data through the interface section 305, under control of a central processing unit (CPU) 310. A memory 311, which is a RAM for a work area, is connected to the CPU 310. Operating information from an operating panel 312 is supplied to the CPU 310 which can control operation corresponding to the operating information. When the, interface section 305 receives controlling data such as an AV/C command, which will be described later on, through the IEEE 1394 system bus, the received data is supplied to the CPU 310 and the CPU 310 is able to control corresponding operation.

Figure 6:
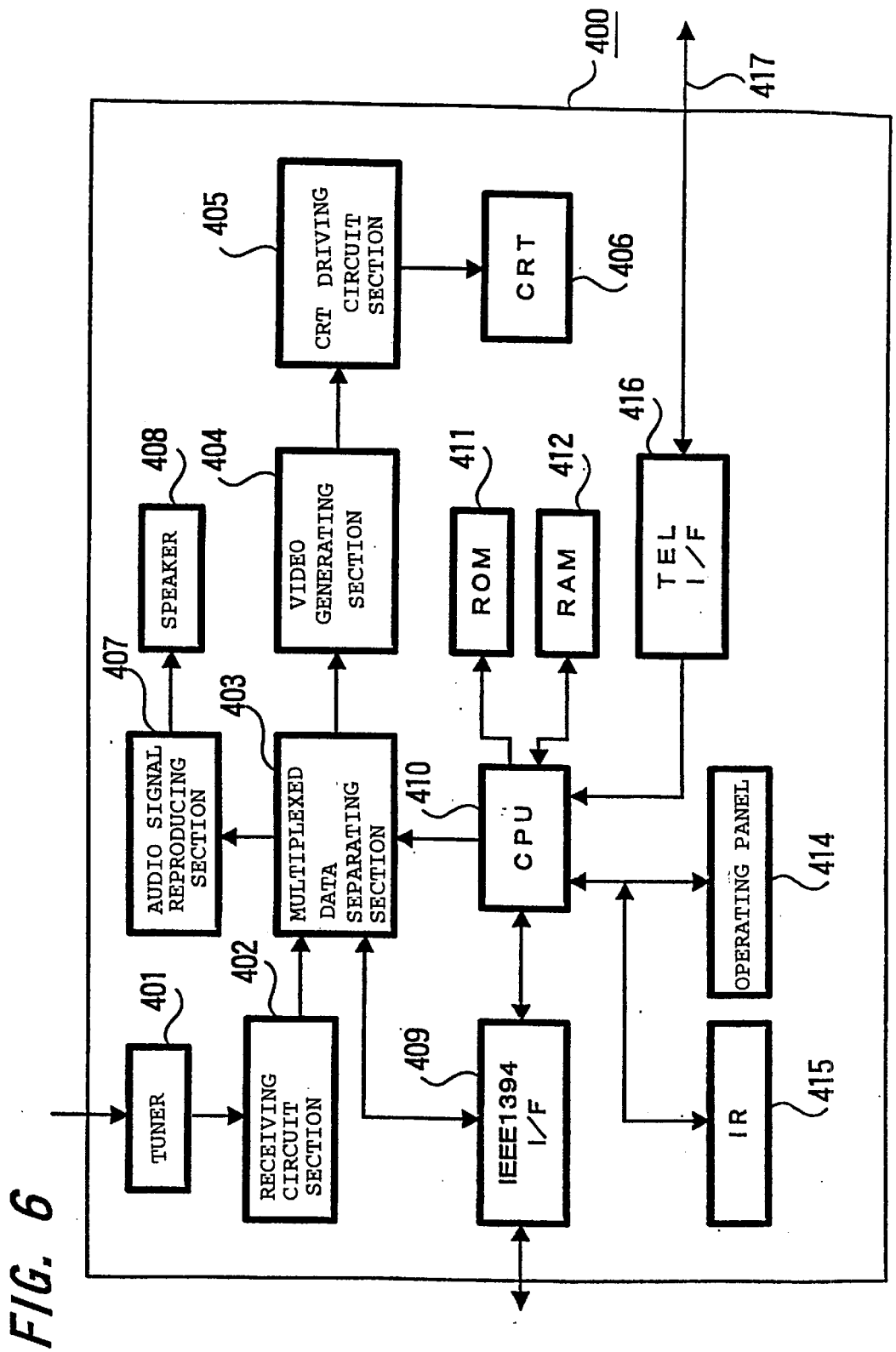
FIG. 6 is a block diagram showing an example of a television receiver.

FIG. 6 is a block diagram showing an example of the television receiver 400. The television receiver 400 according to this embodiment is an apparatus called a digital television receiver capable of receiving and displaying digital broadcast.

Digital broadcast data obtained when a tuner 401 with an antenna, not shown, connected thereto has received data of a predetermined channel is supplied to a receiving circuit section 402 and thereby decoded. The broadcast data thus decoded is supplied to a multiplexed data separating section 403 which separates the supplied broadcast data to provide video and audio data. The video data thus separated is supplied to a video generating section 404, in which it is subjected to reception processing. Based on the processed signal, a CRT driving circuit section 405 drives a cathode-ray tube (CRT) 406 to display a picture. The audio data thus separated by the multiplexed data separating section 403 is supplied to an audio signal playbacking section 407, in which it is processed in audio data such as analog conversion and amplification. The audio signal thus processed is supplied to a speaker 408 and outputted.

The television receiver 400 includes an interface section 409 for connecting circuits to the IEEE 1394 system bus. Video and audio data supplied from the IEEE 1394 system bus to the interface section 409 are supplied to the multiplexed data separating section 403 and thereby a picture can be displayed on the CRT 406 and sounds can be emanated from the speaker 408. Video and audio data received at the tuner 401 are supplied from the multiplexed data separating section 403 to the interface section 409 and thereby transmitted to the IEEE 1394 system bus.

The television receiver 400 displays video data and transmits data through the interface section 409 under control of a central processing unit (CPU) 410. A memory 411, which is a ROM in which programs necessary for control are stored, and a memory 412, which is a RAM for a work area, are connected to the CPU 410 operating information from an operating panel 414 and controlling information received by an infrared-ray light-receiving section 415 from a remote control apparatus ate supplied to the CPU 410 which can control operation corresponding to the operating information and the controlling information. When the interface section 409 receives controlling data such as an AV/C command, which will be described later on, through the IEEE 1394 system bus, the received data is supplied to the CPU 410 and the CPU 410 becomes able to control corresponding operation. The television receiver 400 according to this embodiment is able to execute operation of functioning as an IEEE 1394 system bus controller and hence the CPU 410 can execute processing therefor. Necessary data are stored in the memory 411, for example.

The television receiver 400 according to this embodiment includes an interface sections 416 for connecting it to an external communicating means such as a telephone line network. In the example shown in FIG. 6, this interface section is a telephone line network interface section and connected through a communicating circuit 417 such as a public telephone line network to a communicating network such as the internet.

Next, processing in which data is transmitted through the IEEE 1394 system bus 9 with the respective devices 100, 200, 300, 400 connected thereto will be described.

Figure 7:
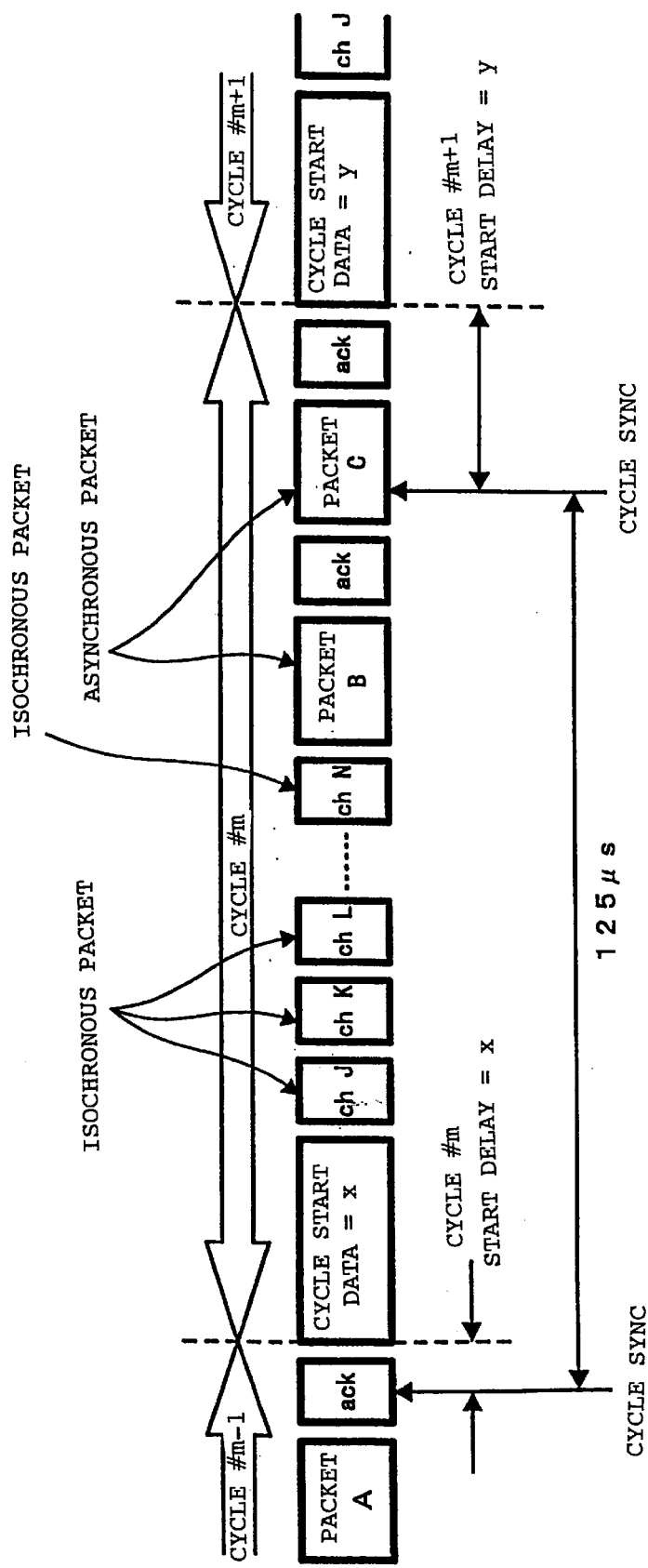
FIG. 7 is an explanatory diagram showing an example of an IEEE 1394 system frame structure.

FIG. 7 is a diagram showing a data transmission cycle structure of a device connected via the IEEE 1394. According to the IEEE 1394, data is divided into packets and transmitted in a time-division manner based on a cycle of a duration of 125 (S. This cycle is created by a cycle start signal supplied from a node having a cycle master function (any device connected to the bus). An isochronous packet secures a band necessary for transmission (referred to as a band although it is a time unit) from the start of all cycles. Accordingly, in the isochronous transmission, the transmission of data within a constant time can be assured. However, if a transmission error occurs, then data will be lost because this data transmission cycle structure has no mechanism for protecting data from the transmission error. In the asynchronous transmission in which a node, which secures a bus as a result of arbitration in a time which is not used in the isochronous transmission of each cycle, transmits the asynchronous packet, although a reliable transmission is assured by using acknowledge and retry, transmission timing cannot be made constant.

When a predetermined node transfers data in the isochronous transfer mode, such node has to be corresponding to the isochronous function. At least one of the nodes corresponding to the isochronous function has to have a cycle master function. Further, at least one of the nodes connected to the IEEE 1394 serial bus has to have an isochronous resource manager function.

Figure 8:
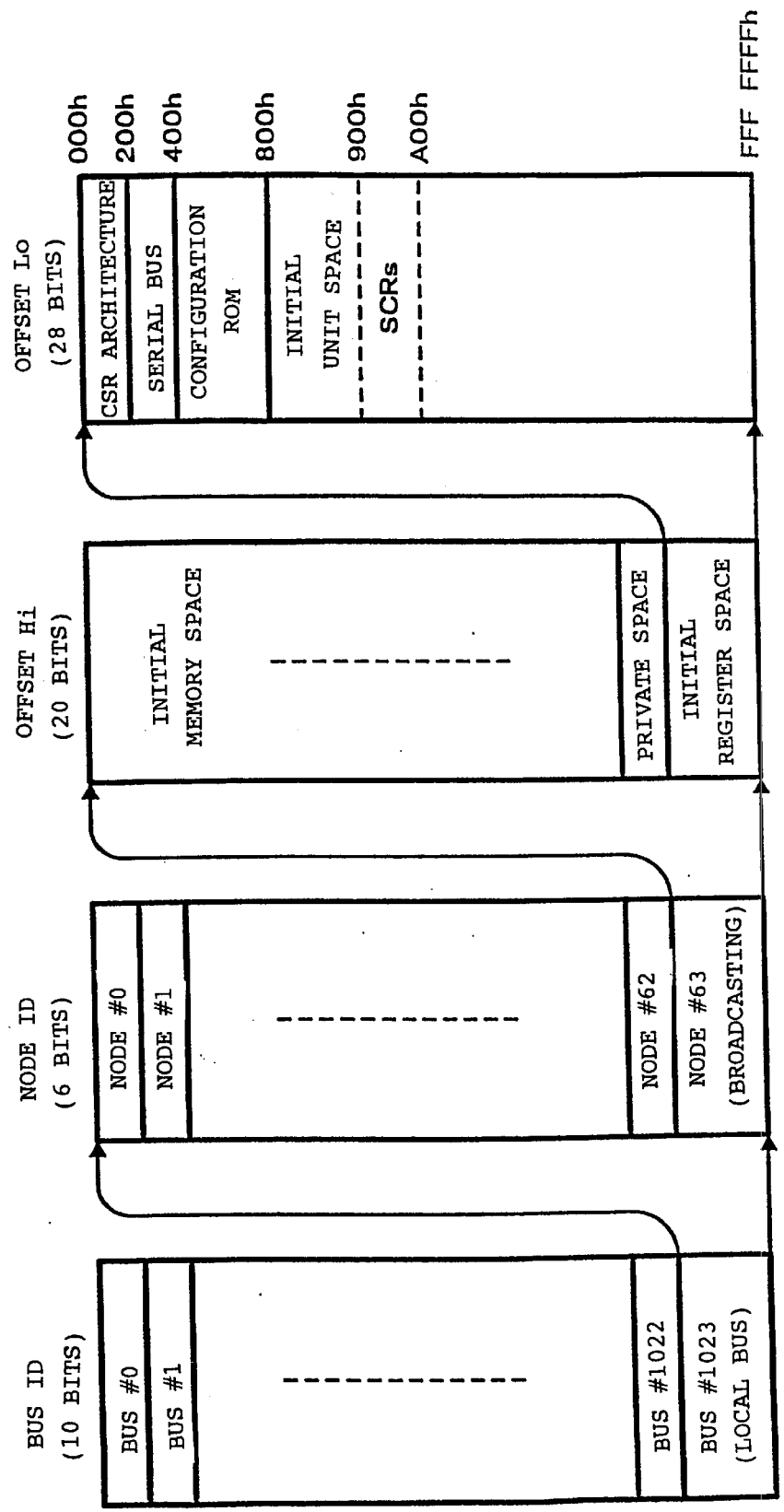
FIG. 8 is an explanatory diagram showing an example of a structure of a CRS architecture address space.

The IEEE 1394 is based on a CSR (Control & Status Register) architecture having 64-bit address space prescribed by the ISO/IEC 13213. FIG. 8 is a diagram to which reference will be made in explaining a CSR architecture address space. High-order 16 bits represent a node ID indicative of a node on each IEEE 1394, and remaining 48 bits are used to designate an address space given to each node. The high-order 16 bits are separated into 10 bits of a bus ID and 6 bits of a physical ID (node ID in a narrow sense). Values in which all bits go to 1 are for use as a special purpose, and hence 1023 buses and 63 nodes can be designated.

A space prescribed by high-order 20 bits of 256-terabyte space prescribed by low-order 48 bits is separated into an initial register space (Initial Register Space) for use as a register unique to 2048-byte CSR, a register unique to the IEEE 1394 or the like, a private space (Private Space) and an initial memory space (Initial Memory Space). A space prescribed by low-order 28 bits are for use as a configuration ROM (Configuration read only memory), an initial unit space (Initial Unit Space) for use unique to a node and a plug control register (Plug Control Register (PCRs)) if a space prescribed by its high-order 20 bits is the initial register space.

FIG. 9 is a diagram to which reference will be made in explaining offset addresses, names and operation of major CSRs. The offset in FIG. 9 indicates an offset address from FFFFF0000000h (numerals with h represent a hexadecimal notation). A bandwidth available register (Bandwidth Available Register) having an offset 220h represents a band which can be allocated to the isochronous communication, and a value of node which is being operated as an isochronous resource manager is made effective. Specifically, although each node includes the CSR shown in FIG. 8, only the bandwidth available register of the isochronous resource manager is made effective. In other words, only the isochronous resource manager includes the bandwidth available register substantially. The bandwidth available register preserves a maximum value when the band is not allocated to the isochronous communication and its value decreases each time the band is allocated to the isochronous communication.

A channel available register (Channel Available Register) of offsets 224h to 228h has bits respectively corresponding to channel numbers from channel 0 to channel 63. If the bits is 0, then this shows that the corresponding channel is already allocated only the channel available register of the node which is being operated as the isochronous resource manager is effective.

Referring back to FIG. 8., a configuration ROM based on a general ROM (read only memory) is located at addresses 200h to 400h within the initial register space. Bus info block, root directory and unit directory are located at the configuration ROM. An ID code indicative of vender of device is stored in a vender A ID within the bus info block. A unique ID unique to the device is stored in a chip ID (Chip ID).

In order to control input and output of the device through the interface, the node includes a PCR (Plug Control Register), prescribed by the IEC 1833, at addresses 900h to 9FFh within the initial unit space shown in FIG. 8. This is a substantiation of a concept of a plug in order to form a signal channel similar to an analog interface from a logical standpoint. FIG. 10 is a diagram to which reference will be made in explaining the arrangement of the PCR. The PCR includes an oPCR (output Plug Control Register) expressing an output plug and an iPCR (input Plug Control Register) expressing an input plug. The PCR also includes registers oMPR (output Master Plug Register) and iMPR (input Master Plug Register) indicating information on the output plug or the input plug proper to each device. Each device cannot include a plurality of oMPRs and iMPRs but can include a plurality of oPCRs and iPCRs corresponding to individual plugs depending upon a device capability. The PCR shown in FIG. 10 includes 31 oPCRs and iPCRs. The flow of isochronous data can be controlled by operating registers corresponding to these plugs.

FIG. 11 is a diagram showing arrangements of the oMPR, the oPCR, the iMPR and the iPCR. FIG. 11A shows the arrangement of the oMPR, FIG. 11B shows the arrangement of the oPCR, FIG. 11C shows the arrangement of the iMPR and FIG. 11D shows the arrangement of the iPCR, respectively. A code indicative of a maximum transfer speed of isochronous data that the device can transmit or receive is stored in the 2-bit data rate capability (data rate capability) on the MSB, side of the oMPR and the iMPR. A broadcast channel base (broadcast channel base) of the oMPR prescribes the channel number for use with the broadcast output (broadcast output).

The number of the output plugs of the device, i.e., the value indicative of the number of the oPCRs is stored in the number of the output plugs (number of output plugs) of 5 bits on the LSB side of the oMPR. The number of the input plugs of the device, i.e., the value indicative of the number of the iPCRs is stored in the number of the input plugs (number of input plugs) of 5 bits on the LSB side of the iMPR. A main extended field and an auxiliary extended field are the areas defined for future extension.

An on-line (on-line) on the MSB of the oPCR and the iPCR show the state in which the plug is in use. Specifically, if its value is 1, then it is indicated that the plug is on-line. If its value is 0, then it is indicated that the plug is off-line. A value of the broadcast connection counter (broadcast connection counter) of the oPCR and the iPCR expresses whether the broadcast connection exists (1) or not (0). A value that a point-to-point connection counter (point-to-point connection counter) having a 6-bit width of the oPCR and the iPCR has expresses the number of point-to-point connection (point-to-point connection) of the plug. The point-to-point connection is a connection used to transmit data among one specified node and other specified nodes.

A value of a channel number (channel number) having a 6-bit width of the oPCR and the iPCR expresses the isochronous channel number to which the plug is connected. A value of a data rate (data rate) having a 2-bit width of the oPCR expresses a real transmission speed of packets of the isochronous data outputted from the plug. A code stored in an overhead ID (overhead ID) having a 4-bit width of the oPCR expresses a band width of overhead of the isochronous communication. A value of a payload (payload) having a 10-bit width of the oPCR expresses a maximum value of data contained in the isochronous packets that the plug can handle.

Figure 12:
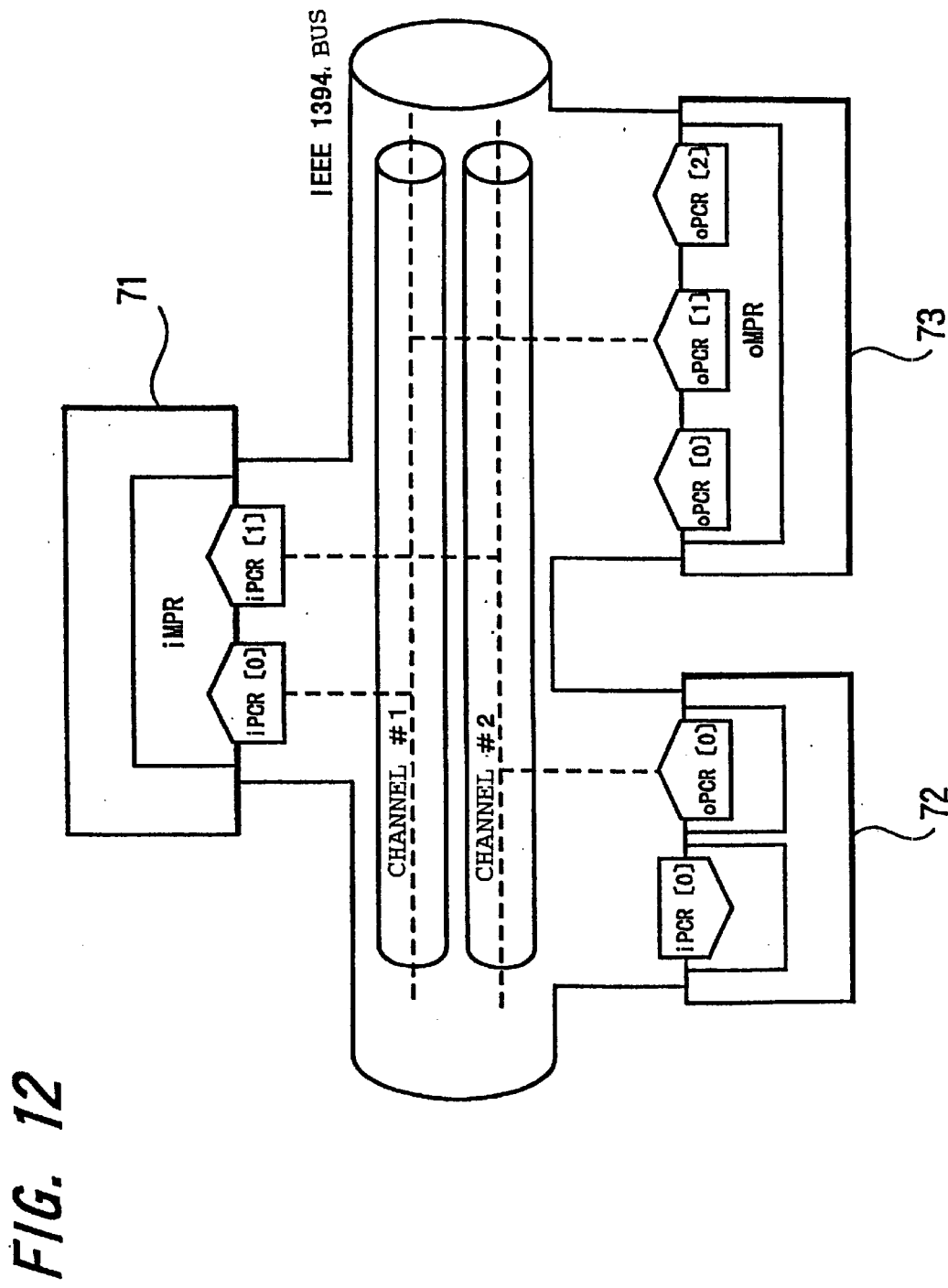
FIG. 12 is an explanatory diagram showing an example of a relationship among plugs, plug control registers and transmission channels.

FIG. 12 is a diagram showing a relationship among the plug, the plug control register and the isochronous channel. Devices connected to the IEEE 1394 system bus are shown as AV devices (AV-device) 71 to 73. Isochronous data whose channel was designated by the oPCR [1] of the oPCR [0] to the oPCR [2] in which the transmission speed and the number of the oPCRs are prescribed by the oMPR of the AV device 73 is transmitted to the channel #1 (channel #1) of the IEEE 1394 serial bus. Transmission speed and the number of the iCPR are prscribed by the iMPR of the AC device 71. The AV device 71 reads the isochronous data transmitted to the channel #1 of the IEEE 1394 serial bus. In like manner, the AV device 72 transmits isochronous data to the channel #2 (channel #2) designated by the oPCR [0], and the AV device 71 reads the isochronous data from the channel #2 designated by the iPCR [1].

In this manner, data is transmitted among the devices connected by the IEEE 1394 serial bus. The system according to this embodiment can carry out control of respective devices and judge the states thereof by using an AV/C command set prescribed as a command for controlling the devices connected by the IEEE 1394 serial bus. The AV/C command set will be described next.

First, a data structure of a subunit identifier descriptor (Subunit Identifier Descriptor) in the AV/C command used by the system according to this embodiment will be described with reference to FIGS. 13 to 16. FIG. 13 shows the data structure of the subunit identifier descriptor. As shown in FIG. 13, data is formed by lists of a hierarchical structure of the subunit identifier descriptor. A list expresses a receivable channel if it is a tuner and expresses a recorded number if it is a disc. The list at the uppermost position of the hierarchical structure is called a root list, and a list 0 becomes a root for low-order lists other lists also become root lists. There exist as many root lists as the objects. The object expresses each channel in the digital broadcasting or the like if the AV device connected to the bus is the tuner. All lists in one hierarchy shares common information.

FIG. 14 shows a format of the general subunit descriptor (The General Subunit Identifier Descriptor). The subunit descriptor describes therein attribute information concerning functions as contents. A descriptor length (descriptor length) field does not contain a value of its own field. A generation ID (generation ID) indicates a version of the AV/C command set, and its value is "00h" (h expresses the hexadecimal notation), for example. "00h" means that the data structure and the command are based on the version 3.0 of the AV/C general specification (General Specification) as shown in FIG. 15, for example. As shown in FIG. 15, all values excepting "00h" are reserved for future specification.

A size of list ID (size of list ID) expresses the number of bytes of the list ID. A size of object ID (size of object ID) expresses the number of bytes of the object ID. A size of object position (size of object position) expresses the position (number of bytes) in the list which is looked up in the course of control. The number of root object list (number of root object list) expresses the number of the root object lists. A root object list ID (root object list id) shows an ID used to identify the highest-order root object list in the respective independent hierarchies.

A subunit dependent length (subunit dependent length) expresses the number of bytes of a following subunit dependent data field (subunit dependent information) field. The subunit dependent data field is the field indicating function dependent information. A manufacturer dependent data length (manufacturer dependent length) indicates the number of bytes of a following manufacturer dependent data (manufacturer dependent information) field. Manufacturer dependent data is a field indicating specification information of a vender (manufacturer). When the descriptor does not contain the manufacturer dependent data, this field does not exist.

FIG. 16 shows a range in which the list ID shown in FIG. 14 is allocated. As shown in FIG. 16, "0000h to 0FFFh" and "4000h to FFFFh" are reserved as allocation ranges for future specification. "1000h to 3FFFh" and "10000h to maximum value of list ID" are prepared in order to identify dependent information of function types. Next, the AV/C command set used in the system according to this embodiment will be described with reference to FIGS. 17 to 22. FIG. 17 shows a stack model of the AV/C command set. As shown in FIG. 17, a physical layer 81, a link layer 82, a transaction layer 83 and a serial bus management 84 are based on the IEEE 1394. An FCP Function Control Protocol)

85 is based on the IEC 61883. An AV/C command set 86 is based on the 1394 TA specification.

FIG. 18 is a diagram used to explain commands and responses of the FCP 85 shown in FIG. 17. The FCP is the protocol used to control devices (nodes) on the IEEE 1394 system bus. As shown in FIG. 18, a control side is set to a controller and a controlled side is set to a target. The transmission or the response of the command in the FCP is executed between the nodes by using a write transaction of the asynchronous communication of the IEEE 1394 asynchronous communication. The target which received data returns acknowledge to the controller in order to confirm the reception.

Figure 19:
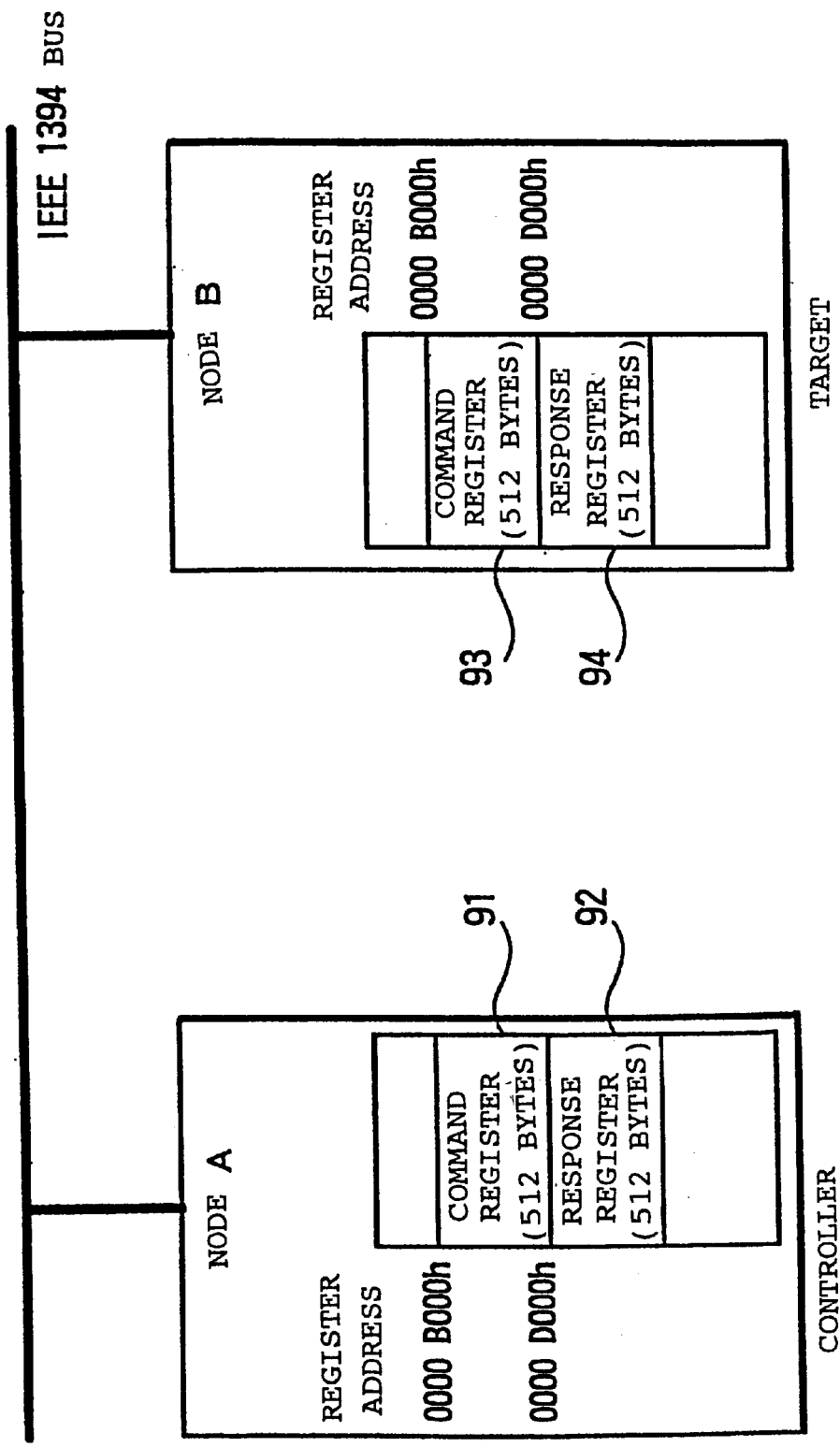
FIG. 19 is an explanatory diagram showing more detailed example of a relationship between a command and a response of an AV/C command.

FIG. 19 is a diagram to which reference will be made in explaining the relationship between the command and the response in the FCP shown in FIG. 18 more in detail. Nodes A and B are connected together via the IEEE 1394 bus. The node A is the controller and the node B is the target. Both of the nodes A and B include 512-byte command register and response register. As shown in FIG. 19, the controller transmits a command by writing a command message in a command register 93 of the target. Conversely, the target transmits a response by writing a response message in a response register 92 of the controller. Control information is transmitted and received for the above two messages. The types of the command set transmitted by the FCP are written in a CTS in the data field of FIG. 20 which will be described later on.

Figure 20:
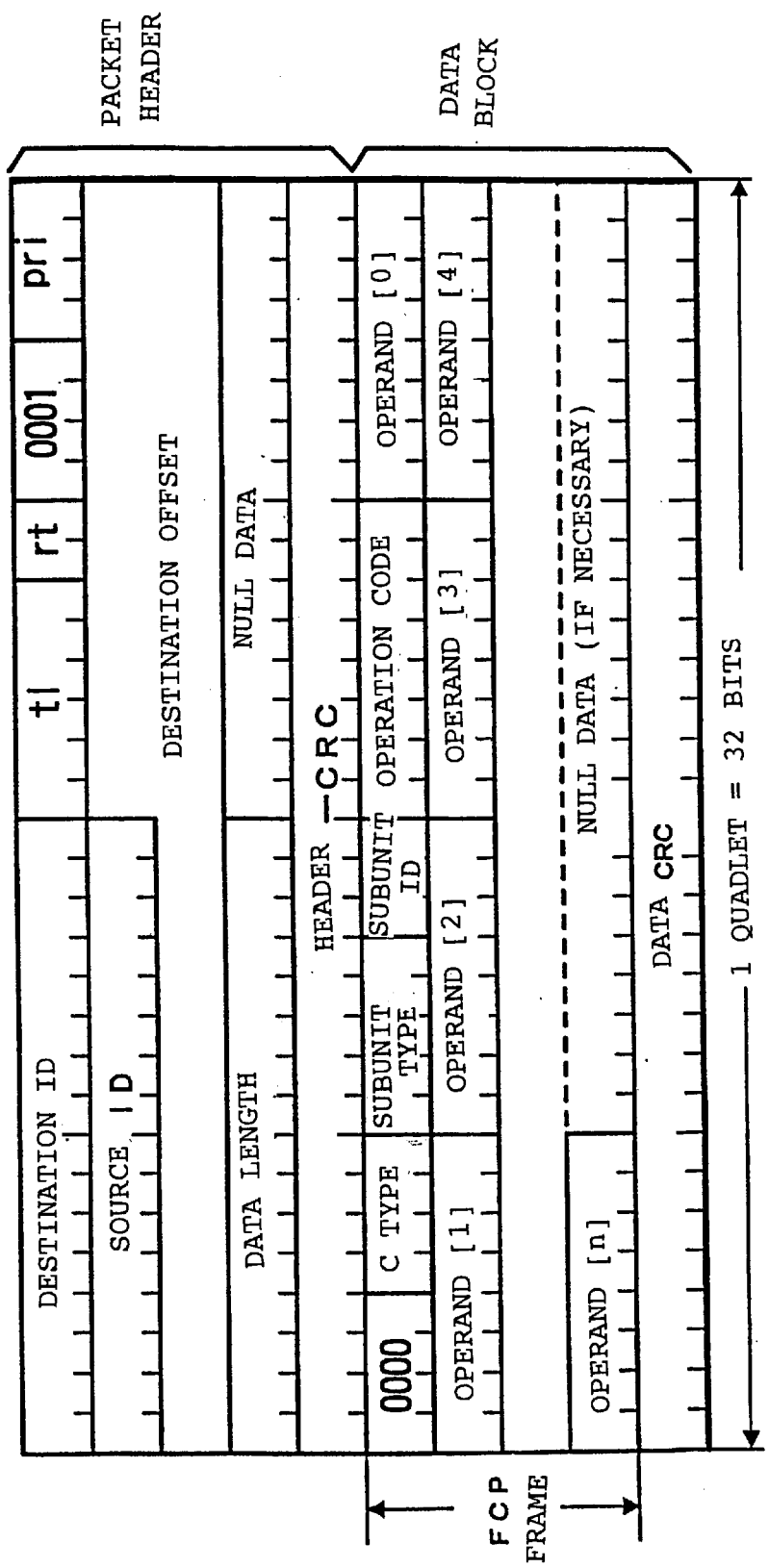
FIG. 20 is an explanatory diagram showing an example of a data structure of an AV/C command.

FIG. 20 shows a data structure of packets transmitted in the asynchronous transfer mode of the AV/C command. The AV/C command set is the command set used to control the AV devices, and CTS (command set ID)="0000". An AV/C command frame and a response frame are transmitted and received between the nodes by using the above FCP. In order to prevent a load from being imposed upon the bus and the AV device, the response for the command should be transmitted within 100 ms. As shown in FIG. 20, data of asynchronous packet is comprised of 32 bits (=1 quadlet) in the horizontal direction. In the figure, the upper stage shows a packet header portion and the lower stage in the figure shows a data block. A destination (destination ID) shows a destination.

The CTS shows a command set ID and CTS="0000" in the AV/C command set. A C type/response (ctype/response) field shows a command function type, when the packet is the command, and shows a processed result of command when the packet is the response. Roughly classified, there are four types of commands wherein (1) a command (CONTROL) for controlling the functions from the outside, (2) a command (STATUS) for inquiring the status from the outside, (3) a command (GENERAL INQUIRY (existence of support of opcode) and SPECIFIC INQUIRY (existence of support of opcode and operands)) and (4) a command (NOTIFY) for notifying the change of the status to the outside.

Response messages are returned in response to the type of the command. Response messages for the control (CONTROL) command are "not implemented" (NOT IMPLEMENTED), "accepted" (ACCEPTED), "rejected" (REJECTED) and "interim" (INTERIM). Response messages for the status (STATUS) command are "not implemented" (NOT IMPLEMENTED), "rejected" (REJECTED), "in transition" (IN TRANSITION) and "stable" (STABLE). Response messages for the command (GENERAL INQUIRY and SPECIFIC INQUIRY) for inquiring the existence of the support of the command from the outside are "implemented" (IMPLEMENTED) and "not implemented" (NOT IMPLEMENTED). Response messages for the command (NOTIFY) for notifying the change of the status to the outside are "not implemented" (NOT IMPLEMENTED), "rejected" (REJECTED), "interim" (INTERIM) and "changed" (CHANGED).

The subunit type (subunit type), is provided in order to specify functions within the device, and tape recorder/player (tape recorder/player), tuner (tuner) and so on are allocated to the subunit type. In order to discriminate a plurality of subunits of the same type, addressing is executed by the subunit ID (subunit ID) as a discrimination number. An operation code (opcode) expresses a command, and an operand (operand) expresses a parameter of a command. There are prepared fields (additional operands) added if necessary. Null data and the like are added to the operand if necessary. A data CRC (Cyclic Reduncy Check) is used to check errors when data is transmitted.

FIG. 21 shows examples of the AV/C command in concrete. The left-hand side in FIG. 21 shows examples of the c type/response message in concrete. In the figure, the upper stage expresses command messages, and the lower stage in the figure expresses response messages. Control (CONTROL) is allocated to "0000", status (STATUS) is allocated to "0001", specific inquiry (SPECIFIC INQUIRY) is allocated to "0010", notify (NOTIFY) is allocated to "0011", and general inquiry (GENERAL INQUIRY) is allocated to "0100". "0101 to 0111" are reserved for future specification. Not implemented (NOT IMPLEMENTED) is allocated to "1000", accepted (ACCEPTED) is allocated to "1001", rejected (REJECTED) is allocated to "1010", in transition (IN TRANSITION) is allocated to "1011", implemented (IMPLEMENTED/STABLE) is allocated to "1100", changed (CHANGED) is allocated to "1101" and interim (INTERIM) is allocated to "1111". "1110" is reserved for future specification.

The center portion in FIG. 21 shows examples of subunit types in concrete. A video monitor is allocated to "00000", a disc recorder/player is allocated to "00011", a tape recorder/player is allocated to "00100", a tuner is allocated to "00101", a video camera is allocated to "00111", a vender unique subunit type (Vender unique) is allocated to "11100" and a specific subunit type (subunit type extended to next byte) is allocated to "11110". While a unit is allocated to "11111", this is used when it is transmitted to the device itself and might be the on/off of the power supply.

The right-hand side of FIG. 21 shows examples of operation code (operation code: opcode) in concrete. A table of operation codes exists at every subunit type. The right-hand side shows operation codes obtained when the subunit type is the tape recorder/player. Operands are defined for every operation code. A vender dependent value (vender dependent) is allocated to "00h", a search mode is allocated to "50h", a time code is allocated to "51h", an ATN is allocated to "52h", an open memory is allocated to "60h", a memory read is allocated to "61h", a memory write is allocated to "62h", a load is allocated to "C1h", a recording is allocated to "C2h", a reproduction is allocated to "C3h" and a rewinding is allocated to "C4h".

FIG. 22 shows examples of the AV/C command and response in concrete. For example, when a user instructs a playback to a playbacking device serving as a target (consumer), the controller transmits the command shown in FIG. 22A to the target. Since this command uses the AV/C command set, CTS="0000". Since the ctype uses the command (CONTROL) for controlling the device from the outside, c type="0000" (see FIG. 21). Since the subunit type is the tape recorder/player, the subunit type="00100 (see FIG. 21). Identification code id shows the case of ID0 and hence id=000. The operation code is allocated to "C3h" which means the reproduction (see FIG. 21). The operand is allocated to "75h" which means the forward direction (FORWARD). When data is playbacked, the target transmits the response message shown in FIG. 22B to the controller. Since the response message "ACCEPTED" (accepted) enters the response message, response="1001" (see FIG. 21). Portions other than the response are the same as those of FIG. 22A and therefore need not be described.

Next, an example of processing executed by the system configuration shown in FIG. 2 under control of the above AV/C command set will be described. In the case of this embodiment, the devices connected to the bus 9 as shown in FIG. 2 can be arranged as shown in FIG. 1 from a device operation standpoint.

Figure 1:
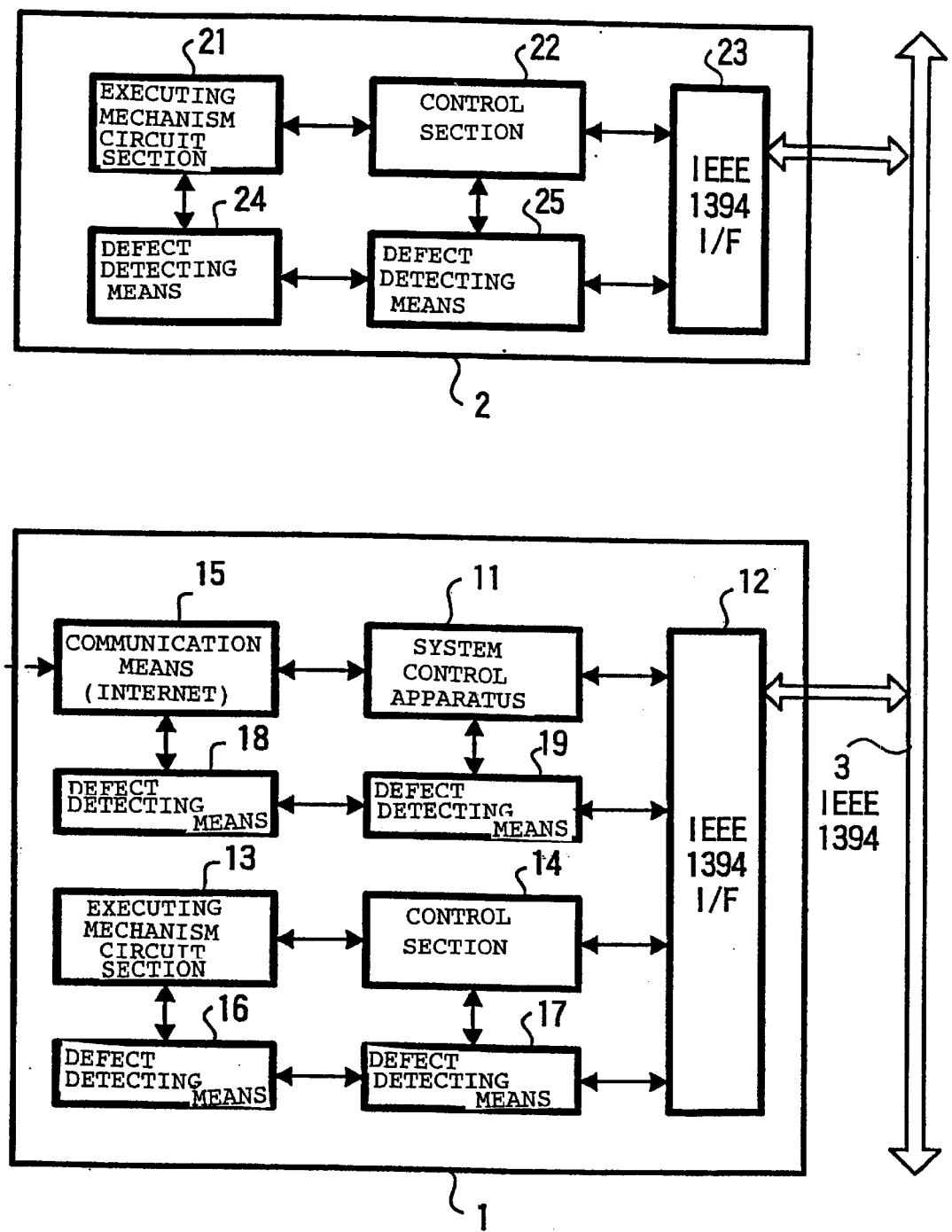
FIG. 1 is a block diagram showing an example of an electronic device to which an embodiment according to the present invention is applied.

As shown in FIG. 1, there are provided a controller 1 serving as a master device and a plurality of targets 2 (only one target is represented) serving as slave devices. These controller 1 and target 2 are connected with each other by the IEEE 1394 bus line 9, for example. The controller 1 is the television receiver 400 shown in FIG. 2, for example. The target 2 corresponds to the video recording and playbacking apparatus 100, the audio recording and playbacking apparatus 200 or the audio playbacking apparatus 300 shown in FIG. 2, for example. FIG. 1 shows only one device as the target 2.

The controller 1 includes a system control apparatus 11 for generating a signal containing a synchronizing signal (cycle start), for example, to control the whole of the system. This system control apparatus 11 is connected through an interface (I/F) circuit 12, prescribed by the IEEE 1394, for example, to the bus line 9.

The above target 2 includes an executing mechanism circuit section 21 for executing processing such as arbitrary video recording and reproduction/disc reproduction/television reception done by this apparatus. The executing mechanism circuit section 21 is controlled by a signal from a control section 22, and the executing mechanism circuit section 21 and the control section 22 are connected through an interface (I/F) circuit 23, prescribed by the IEEE 1394, for example, to the bus line 9. Further, in the ordinary system configuration, the controller 1 also includes a function of an arbitrary target device wherein an executing mechanism circuit section 13 and a control section 14 for executing similar processing are connected through the interface circuit 12 to the bus line 9.

Audio and video signals and the like transmitted and received between the executing mechanism circuit sections 13 and 21, for example, are transmitted by the isochronous packets. Control signals or the like for mutually controlling the control sections 14, 22 are transmitted by asynchronous packets. The above system control apparatus 11 can set transmission channels of the isochronous packets, can allow transmission by the asynchronous packets, can control its timing and can set an identification code (ID) for discriminating respective devices in a centralized fashion.

Consequently, the controller 1 and the target 2 can communicate with each other and the arbitrary targets 2 can communicate with each other. When the controller 1 is set to the television receiver 400 and the target 2 is set to the video recording and playbacking apparatus 100, for example, a video signal playbacked by the executing mechanism circuit section 21, for example, is transmitted through the interface circuit 23 by the isochronous packets of arbitrary channel on the bus line 3 and this signal is supplied through the interface circuit 12 to the executing mechanism circuit section 13. In this manner, the video signal playbacked by the video recording and playbacking apparatus serving as the target 2, for example, is received and playbacked by the television receiver serving as the controller 1.

When the control sections 14, 22 are controlled with each other, an identification code of a desired apparatus is added to a destination ID (destination ID) which is an identification code of a destination (written) apparatus provided at the first half 2 bytes of the first line of the asynchronous packet, for example. The above various control data are disposed on the data field of the asynchronous packet and transmitted through the interface circuits 12, 23 to the bus line 9.

Further, it is determined by the interface circuits 12, 23 on the receiving side whether or not the identification code (destination ID) of the above asynchronous packet coincides with the identification code of its own device. If it is determined that they agree with each other, then the control data disposed on the packet is written in designated address (destination offset) of the control sections 14, 22. Consequently, the control sections 14, 22 can execute control based on these data.

In this manner, the control sections 14, 22 are controlled with each other. Under control of these control sections, desired audio and video signals are transmitted and received between the executing mechanism circuit sections 13 and 21. As a consequence, the playbacked signal from the video recording and playbacking apparatus, for example, can be received and playbacked by the television receiver and the playbacked signal from the audio playbacking apparatus can be transmitted to and dubbed by the audio recording and playbacking apparatus under control of these control sections. Moreover, these controls can be executed by operating only one device.

Accordingly, in this system, a communication means 15 for communicating with the outside is connected to the system control apparatus 11 of the controller 1, for example. Devices can communicate with a service station of an arbitrary vender, or the like through this communication means 15. Thus, the service station of the vender, for example, can access respective devices through the system control apparatus 11 and the bus line 9. When such communication is effected through a so-called internet, it is possible to realize a highly-efficient communication.

Further, in this system, defect detecting means 24, 25 for detecting respective defects are connected to the executing mechanism circuit section 21 and the control section 22 of the above target 2. Defect detecting means 16, 17 for detecting respective defects are also connected to the executing mechanism circuit section 13 and the control section 14 of the controller 1. Defect detecting means 18, 19 for detecting respective defects are also connected to the communication means 15 and the system control apparatus 11. These detecting means 16 to 19, 24, 25 are connected through the interface circuits 12, 23 to the bus line 9.

In this system, when an instruction is issued through the above communication means 15 or switches (not shown) on an arbitrary device are operated, the defects of the above respective devices can be detected and repaired by using the IEEE 1394 interface, for example. Specifically, in that case, there is used the function control protocol (Function Control Protocol) prescribed by the ICE 61883 on which the AV/C command of the IEEE 1394 interface, for example, is based.

The arrangement of the asynchronous packet prescribed by the function control protocol (FCP) is the packet arrangement that has already been shown in FIG. 20.

In this function control protocol frame (FCP frame), there is newly determined a service (SERVICE) command. Specifically, the service (SERVICE) command is determined by using an arbitrary value from reserved values of the above operation code (opcode), for example. This value is determined as the standard of the IEEE 1394, for example, so that it may be made common to all venders.

A code indicative of service type (type) is set to an operand [0] following the operation code (opcode) of this service (SERVICE). In this code, there are provided a vender common (common) as a hexadecimal value (0016) and a vender dependent (Vender dependent) as a value (1016). A numerical value of type (type) dependent data length (type dependent length) is set to an operand [1].

Further, a code indicative of a category is set to an operand [2]. In this code, there are provided a diagnose (diagnose) as a hexadecimal value (0016) and a service (service) as a value (1016), for example. Then, a category dependent field (category dependent field) is set to the operand following an operand [3].

When a defect of a device is detected, for example, as shown in FIG. 23, for example, the operation code is set to the service (SERVICE), the service type of the operand [0] is made common (common), the type dependent length of the operand [1] is set to an arbitrary numerical value, the category of the operand [2] is set to the diagnose (diagnose) and an error code is set to the operand [3].

Then, such packet is transmitted from the system control apparatus 11 of the above controller 1, for example, to the respective detecting means 16 to 19, 24, 25 of the controller 1 and the target 2 sequentially. Concurrently therewith, information of defects is transmitted from the respective detecting means 16 to 19, 24, 25 back to the system control apparatus 11. In actual practice, a value (FFFF16) is set to the above operand [3] and transmitted from the system control apparatus 11, and predetermined error codes are transmitted from the respective detecting means 16 to 19, 24, 25 back to the system control apparatus.

In this manner, information of defects from the respective detecting means 16 to 19, 24, 25 is collected by the system control apparatus 11. Consequently, even when the user cannot visually specify and confirm a defective device from the conventional system in which the video recording and playbacking apparatus 100 manufactured by the vender A, the audio recording and playbacking apparatus 200 manufactured by the vender B, the audio playbacking apparatus 300 manufactured by the vender C and the television receiver 400 manufactured by the vender D are connected to the bus line 100, for example, the user can discriminate the defective device from other devices by executing the above defect detection processing.

As described above, according to the above apparatus, in the system in which a plurality of devices are connected through the IEEE 1394 interface, for example, the user can discriminate the defective device that cannot be visually confirmed and can request the vender to repair the defective device. Therefore, the defective device can be repaired rapidly without wasting plenty of time and labor. The above values set to the respective operands are also determined as the IEEE 1394 standard, for example, so that they may be made common to all venders.

After the defective device has been detected as described above, as shown in FIG. 24, for example, the service type of the above operand [0] is set to the vender dependent (Vender dependent) and the apparatus can be repaired by data processing such as detecting defects more in detail and changing set values. Specifically, in FIG. 24, the service type of the operand [0] is set to the vender dependent (Vender dependent) and the type dependent length of the operand [1] is set to an arbitrary numerical value.

Further, predetermined vender identification codes (Vender ID) are set to the operands [2] to [4]. This vender identification code has already been determined as the IEEE 1394 standard, for example. Then, the operands following the operand [5] are set to the vender ID dependent field (Vender ID dependent field) in which there are set data for detecting defects more in detail and data for repairing a defective device by venders.

The device that had been detected as the defective device can be repaired by data processing such as detecting defects more in detail and changing the set values on the vender side. When the above controller 1 includes the communication means 15, for example, data used to detect defects more in detail and to repair the defective device are transmitted through the internet, for example, so that the defect of the above device can be detected more fully and the defective device can be repaired.

Specifically, in FIG. 2, for example, when the television receiver 400 manufactured by the vender C is set to the controller and this television receiver 400 includes the communication means to make connection with the internet or the like, first, a service home page provided by the vender D is connected to the devices to detect a defective device. If a defective device is discriminated from other devices, a service home page provided by the vender of the defective device is connected to the defective device to transmit predetermined data and the like so that a defect can be detected more in detail and the defective device can be repaired.

When data and the like for detecting the defect more in detail and for repairing the defective device are transmitted, if the above vender identification code is added to the above data, then it is possible to prevent the device manufactured by other vender from being treated erroneously. When a large amount of information concerning service is accessed from the outside, a service AV/C descriptor is defined to each device.

Further, these data can be accessed by using AV/C open/read/write descriptor (OPEN/READ/WRITE Descriptor) commands prescribed by the IEEE 1394, for example. When a large amount of data is transmitted in order to correct a program or the like, there can be used AV/C managed asynchronous connections (AV/C Managed Asynchronous Connections).

When these commands are transmitted and received and data are transmitted and received, a security should preferably be maintained by authenticating the called person and encrypting the code if necessary. In that case, authenticating and encrypting keys can be exchanged by using an AV/C security command (AV/C Security Command) prescribed by the IEEE 1394, for example.

Accordingly, in this apparatus, when the predetermined identification code, the processing target discriminating code, the processing field prescribing code and the processing information are set to the digital interface, the defect of the device can be detected and the detected defective device can be repaired by using these codes so that the defective device can be specified and repaired with ease.

With this arrangement, the convention system in which a plurality of devices are connected by the digital interface cannot specify a defective device when a failure occurs. In that case, extremely a lot of time and labor have been wasted in order to remove such failure. According to the present invention, these problems can be solved with ease.

Specifically, the electronic device, in compliance with a predetermined digital interface in which the predetermined identification code, the processing target discriminating code, the processing field prescribing code and the processing information are set, includes the means for recognizing the identification code, the means for discriminating the processing target when the identification code is recognized and the information executing means for executing processing in accordance with the processing field when the processing target covers its own device. Therefore, it is possible to realize the device in which a defective device can be specified and the defective device can be repaired with ease.

Furthermore, the predetermined identification code, the processing target discriminating code, the processing field prescribing code and the processing executing information are set to the arbitrary digital interface so that when the identification code is recognized, the processing target is discriminated and that when the processing target covers its own device, the processing executing information is executed in accordance with the processing field. Therefore, the defective device can easily be specified and repaired through the digital interface.

The present invention is not limited to the above embodiment and can variously be modified without departing from the gist of the present invention.

What is claimed is:

1. An audio/video electronic device, in compliance with a digital interface for a predetermined network, wherein an identification code for a device on said network, a target code for a predetermined processing, a category code for said processing and executing information for said processing are set on a packet and said packet is transmitted to/from an other device on said network through said digital interface, comprising:

means for recognizing said identification code;

means for discriminating a target device for said processing when said identification code is recognized, wherein either code for targeting a device of any vendor or code for targeting a device of a specific vendor is set to said code; and information executing means for executing said processing in accordance with said category code and said executing information if it is determined that said audio/video electronic device is a target device of said processing by interpreting said target code, wherein, when acting as a master device on said network, said audio/video electronic device transmits said executing information for inquiring a defect of a device with said code for targeting device of any vendor, and when acting as a slave device on said network, said audio/video electronic device transmits information for answering said inquiry about a defect.

2. An electronic device according to claim 1, wherein said category code and said executing information following said code for targeting all devices are determined to be a general purpose code and information and processing is executed in accordance with them.

3. An electronic device according to claim 1, wherein said category code and said executing information following said code for covering vendor dependent device are determined to be vendor unique code and information and processing is executed in accordance with them.

4. An electronic device according to claim 1, wherein said slave device includes a diagnosing means for diagnosing a defect of said device and information from said diagnosing means is transmitted as said answer information to said inquiry about the defect transmitted from said master device.

5. An electronic device according to claim 1, wherein said master device includes communication means for communicating with the outside and said executing information determined to be vendor unique information and which is used to repair said slave device is transmitted together with said code for targeting vendor dependent device through said communication means.

6. An electronic device according to claim 1, wherein said electronic device is in compliance with an AV/C command of IEEE 1394 interface, said identification code is set to the interval of operation code of said AV/C command, said target code is set to a first operand of said AV/C command, said category code is set to a second operand and said executing information is set to a third operand.

7. An audio/video electronic device repair method for an audio/video electronic device in compliance with a digital interface for a predetermined network, said method comprising the steps of:

setting an identification code, a target code for a predetermined processing, a category code for said processing and executing information for said processing on a packet where said packet is transmitted to/from an other device on said network through said digital interface;

discriminating a target device for said processing when said identification code is recognized, wherein either code for targeting a device of any vendor or code for targeting a device of a specific vendor is set to said code; and executing said processing in accordance with said category code and said executing information if it is determined that said audio/video electronic device is a target device of said processing by interpreting said target code, wherein, when acting as a master device on said network, said audio/video electronic device transmits said executing information for inquiring a defect of a device with said code for targeting device of any vendor, and when acting as a slave device on said network, said audio/video electronic device transmits information for answering said inquiry about a defect.

8. An electronic device repair method according to claim 7, wherein said category code and said executing information following said code for targeting all devices are determined to be a general purpose code and information and processing is executed in accordance with them.

9. An electronic device repair method according to claim 7, wherein said category code and said executing information following said code for targeting vendor dependent device are determined to be a vender unique code and information and processing is executed in accordance with them.

10. An electronic device repair method according to claim 7, wherein said slave device diagnoses a defect of said device and transmits said diagnosed result to said master device as said answer information to said inquiry about the defect transmitted from said master device.

11. An electronic device repair method according to claim 7, wherein said master device communicates with the outside and said executing information determined to be vendor unique information and which is used to repair said slave device is transmitted together with said code for targeting vendor dependent device through said communication.

12. An electronic device repair method according to claim 7, wherein said electronic device complies with an AV/C command of IEEE 1394 interface, said identification code is set to the interval of operation code of said AV/C command, said target code is set to a first operand of said AV/C command, said category code is set to a second operand and said executing information is set to a third operand.

* * * * *